(12) United States Patent
Tsou et al.

(10) Patent No.: US 11,315,045 B2
(45) Date of Patent: Apr. 26, 2022

(54) ENTROPY-BASED WEIGHTING IN RANDOM FOREST MODELS

(71) Applicant: Intel Corporation, Santa Clara, CA (US)

(72) Inventors: Yu-Lin Tsou, New Taipei (TW); Shao-Wen Yang, San Jose, CA (US); Hong-Min Chu, Taipei (TW)

(73) Assignee: Intel Corporation, Santa Clara, CA (US)

( * ) Notice: Subject to any disclaimer, the term of this patent is extended or adjusted under 35 U.S.C. 154(b) by 1129 days.

(21) Appl. No.: 15/393,825

(22) Filed: Dec. 29, 2016

(65) Prior Publication Data

US 2018/0189667 A1    Jul. 5, 2018

(51) Int. Cl.
| | |
|---|---|
| G06N 20/20 | (2019.01) |
| G06N 20/00 | (2019.01) |
| G06N 5/00 | (2006.01) |
| G06N 5/04 | (2006.01) |

(52) U.S. Cl.
CPC .............. *G06N 20/20* (2019.01); *G06N 5/003* (2013.01); *G06N 20/00* (2019.01); *G06N 5/045* (2013.01)

(58) Field of Classification Search
CPC ......... G06N 20/00; G06N 5/003; G06N 5/045
USPC .......................................................... 706/12
See application file for complete search history.

(56) References Cited

U.S. PATENT DOCUMENTS

| | | | | |
|---|---|---|---|---|
| 7,783,114 B2 * | 8/2010 | Bradski | ................ | G06K 9/6282 382/224 |
| 9,516,053 B1 * | 12/2016 | Muddu | ................... | G06N 5/022 |
| 2012/0263346 A1 * | 10/2012 | Datta | ................... | G06K 9/4604 382/103 |
| 2016/0282156 A1 | 9/2016 | Ott et al. | | |

OTHER PUBLICATIONS

Rokach et al., "Ensemble-based classifiers", Artificial Intelligence Review 33:1-39, Springer, 2010 (Year: 2010).*
Guo et al., "Ensemble Pruning via Base-Classifier Replacement", International Conference on Web-Age Information Management, WAIM 2011, pp. 505-516, 2011 (Year: 2011).*
Liu, et al. "Random Forest Construction With Robust Semisupervised Node Splitting", IEEE Transactions on Image Processing, vol. 24, No. 1, Jan. 2015 (Year: 2015).*
Kulkarni, et al., "Pruning of Random Forest Classifiers: A Survey and Future Directions", 2012 International Conference on Data Science & Engineering (Year: 2012).*
International Search Report and Written Opinion for PCT Application No. PCT/US2017/062504, dated Mar. 5, 2018, 15 pages.

(Continued)

*Primary Examiner* — Tsu-Chang Lee
(74) *Attorney, Agent, or Firm* — Alliance IP, LLC

(57) ABSTRACT

A weighting value is determined for each of a plurality of decision trees in a random forest model hosted on a particular device, where the weighting is based on entropy of the respective decision tree. A new decision tree is received at the particular device and a weighting value is determined for the new decision tree based on entropy of the new decision tree. Based on the determined weighting value, it is determined whether to add the new the decision tree to the random forest model. A classification for data generated at the particular device is predicted using the random forest model.

20 Claims, 12 Drawing Sheets

(56) References Cited

OTHER PUBLICATIONS

Raziur Rahman et al., "Design of Probabilistic Random Forests with Applications to Anticancer Drug Sensitivity Prediction," Cancer Informatics, pp. 57-73, Mar. 31, 2016.
Stacey J. Winham et al., "A Weighted Random Forests Approach to Improve Predictive Performance," Statistical Analysis and Data Mining: The ASA Data Science Journal, Special Issue: JSM 2012, vol. 6, No. 6, pp. 496-505, Dec. 2013.
Yaqub M. et al., "Investigation of the Role of Feature Selection and Weighted Voting in Random Forests for 3-D Volumetric Segmentation," IEEE Transactions on Medical Imaging, vol. 33, No. 2, pp. 258-271, Feb. 2014.
Yohei Mishina et al., "Boosted Random Forest," in: 2014 International Conference on Computer Vision Theory and Applications (VISAPP), Jan. 5-8, 2014.
International Preliminary Report on Patentability in PCT Application No. PCT/US2017/062504, dated Jul. 2, 2019; 13 pages.
U.S. Appl. No. 15/283,308, filed Oct. 1, 2016, 51 pages.

\* cited by examiner

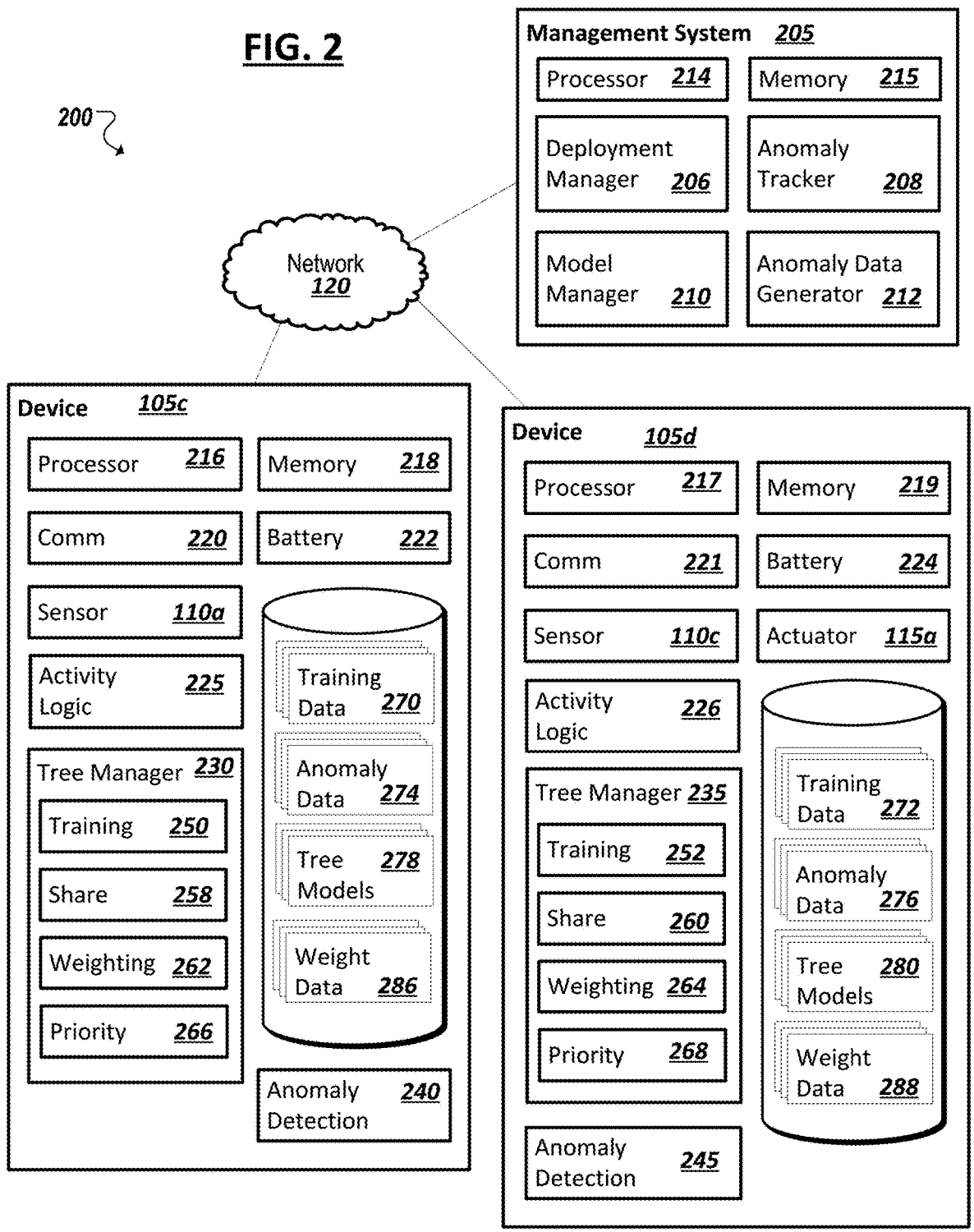

ENTROPY-BASED WEIGHTING IN RANDOM FOREST MODELS

TECHNICAL FIELD

This disclosure relates in general to the field of computer systems and, more particularly, to machine learning in machine-to-machine systems.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow an era of advanced automation and interconnectivity, referred to, sometimes, as the Internet of Things (IoT).

BRIEF DESCRIPTION OF THE DRAWINGS

FIG. 2 illustrates an embodiment of a system including an example management system and device-based decision tree managers.

Like reference numbers and designations in the various drawings indicate like elements.

DETAILED DESCRIPTION OF EXAMPLE EMBODIMENTS

Figure 1A:
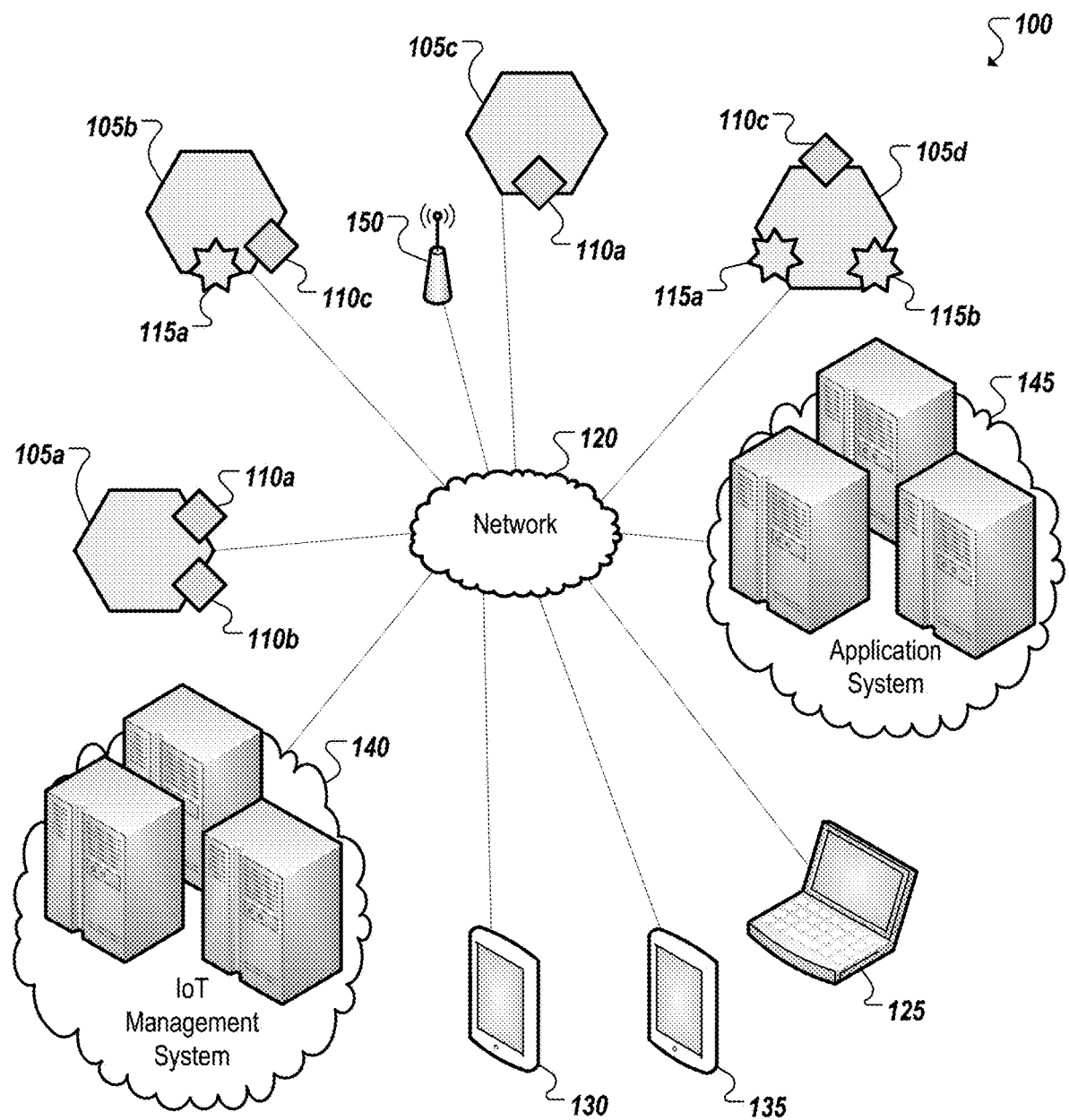
FIG. 1A illustrates an embodiment of a system including multiple sensor devices and an example management system.

FIG. 1A is a block diagram illustrating a simplified representation of a system 100 that includes one or more devices 105a-d, or assets, deployed throughout an environment. Each device 105a-d may include a computer processor and/or communications module to allow each device 105a-d to interoperate with one or more other devices (e.g., 105a-d) or systems in the environment. Each device can further include one or more instances of various types of sensors (e.g., 110a-c), actuators (e.g., 115a-b), storage, power, computer processing, and communication functionality which can be leveraged and utilized (e.g., by other devices or software) within a machine-to-machine, or Internet of Things (IoT) system or application. In some cases, inter-device communication and even deployment of an IoT application may be facilitated by one or more gateway devices (e.g., 150) through which one or more of the devices (e.g., 105a-d) communicate and gain access to other devices and systems in one or more networks (e.g., 120).

Sensors, or sensor assets, are capable of detecting, measuring, and generating sensor data describing characteristics of the environment in which they reside, are mounted, or are in contact with. For instance, a given sensor (e.g., 110a-c) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, sensors (e.g., 110a-c) as described herein, anticipate the development of a potentially limitless universe of various sensors, each designed to and capable of detecting, and generating corresponding sensor data for, new and known environmental characteristics. Actuators (e.g., 115a-b) can allow the device to perform some kind of action to affect its environment. For instance, one or more of the devices (e.g., 105b,d) may include one or more respective actuators that accepts an input and perform its respective action in response. Actuators can include controllers to activate additional functionality, such as an actuator to selectively toggle the power or operation of an alarm, camera (or other sensors), heating, ventilation, and air conditioning (HVAC) appliance, household appliance, in-vehicle device, lighting, among other examples.

In some implementations, sensors 110a-c and actuators 115a-b provided on devices 105a-d can be assets incorporated in and/or forming an Internet of Things (IoT) or machine-to-machine (M2M) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-d), such as devices sourced or controlled by varied groups of entities and employing varied hardware, operating systems, software applications, and technologies. In some cases, a gateway (e.g., 150) may be provided to localize a particular IoT system, with the gateway 150 able to detect nearby devices (e.g., 105a-d) and deploy (e.g., in an automated, impromptu manner) an instance of a particular IoT application by orchestrating configuration of these detected devices to satisfy requirements of the particular IoT application, among other examples.

Facilitating the successful interoperability of such diverse systems is, among other example considerations, an important issue when building or defining an IoT system. Software applications can be developed to govern how a collection of IoT devices can interact to achieve a particular goal or service. In some cases, the logic to implement an IoT application or IoT management system involving multiple IoT devices may be implemented on one or more of the IoT devices. Indeed, in some implementations, logic may be distributed across a collection of IoT devices, with the collective computing resources of the collection of IoT devices being used to implement a particular application, service, or IoT or network manager. In one example, multiple IoT devices may be utilized to collectively implement one or more machine learning models, among other examples.

As shown in the example of FIG. 1, multiple IoT devices (e.g., 105a-d) can be provided from which one or more different IoT application deployments can be built. For instance, a device (e.g., 105a-d) can include such examples as a mobile personal computing device, such as a smart phone or tablet device, a wearable computing device (e.g., a smart watch, smart garment, smart glasses, smart helmet, headset, etc.), purpose-built devices and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1, software-based IoT management platforms can be provided to allow developers and end users to build and configure IoT applications and systems. An IoT application can provide software support to organize and manage the operation of a set of IoT devices for a particular purpose or use case. In some cases, an IoT application can be embodied as an application on an operating system of a user computing device (e.g., 125), a mobile app for execution on a smart phone, tablet, smart watch, or other mobile device (e.g., 130, 135), a remote server, and/or gateway device (e.g., 150). In some cases, the application can have or make use of an application management utility allowing users to configure settings and policies to govern how the set devices (e.g., 105a-d) are to operate within the context of the application. A management utility can also be used to orchestrate the deployment of a particular instance of an IoT application, including the automated selection and configuration of devices (and their assets) that are to be used with the application. A management utility may also manage faults, outages, errors, and other anomalies detected on the various devices within an IoT application deployment. Anomalies may be reported to the management utility, for instance, by the IoT devices as they determine such anomalies. A management utility may additionally assist IoT devices with anomaly detection. Devices may utilize anomaly detection models, which may be provided or developed with assistance of a management utility, among other examples.

In some cases, an IoT management application may be provided (e.g., on a gateway, user device, or cloud-based server, etc.), which can manage potentially multiple different IoT applications or systems. Indeed, an IoT management application, or system, may be hosted on a single system, such as a single server system (e.g., 140), a single end-user device (e.g., 125, 130, 135), or a single gateway device (e.g., 150), among other examples. Alternatively, an IoT management system can be distributed across multiple hosting devices (e.g., 125, 130, 135, 140, 150, etc.).

As noted above, IoT applications may be localized, such that a service is implemented utilizing an IoT system (e.g., of devices 105a-d) within a specific geographic area, room, or location. In some instances, IoT devices (e.g., 105a-d) may connect to one or more gateway devices (e.g., 150) on which a portion of management functionality (e.g., as shared with or supported by management system 140) and a portion of application service functionality (e.g., as shared with or supported by application system 145). Service logic and configuration data may be pushed (or pulled) to the gateway device 150 and used to configure IoT devices (e.g., 105a-d, 130, 135, etc.) within range or proximity of the gateway device 150 to allow the set of devices to implement a particular service within that location. A gateway device (e.g., 150) may be implemented as a dedicated gateway element, or may be a multi-purpose or general purpose device, such as another IoT device (similar to devices 105a-d) or user device (e.g., 125, 130, 135) that itself may include sensors and/or actuators to perform tasks within an IoT system, among other examples.

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 140, 145). For instance, the IoT system can connect (e.g., directly or through a gateway 150) to a remote service (e.g., 145) over one or more networks 120. In some cases, the remote service can, itself, be considered an asset of an IoT application. Data received by a remotely-hosted service can be consumed by the governing IoT application and/or one or more of the component IoT devices to cause one or more results or actions to be performed, among other examples.

One or more networks (e.g., 120) can facilitate communication between sensor devices (e.g., 105a-d), end user devices (e.g., 123, 130, 135), gateways (e.g., 150), and other systems (e.g., 140, 145) utilized to implement and manage IoT applications in an environment. Such networks can include wired and/or wireless local networks, public networks, wide area networks, broadband cellular networks, the Internet, and the like.

In general, "servers," "clients," "computing devices," "network elements," "hosts," "system-type system entities," "user devices," "gateways," "IoT devices," "sensor devices," and "systems" (e.g., 105a-d, 125, 130, 135, 140, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1A is described as containing or being associated with a plurality of elements, not all elements illustrated within computing environment 100 of FIG. 1A may be utilized in each alternative implementation of the present disclosure. Additionally, one or more of the elements described in connection with the examples of FIG. 1A may be located external to computing environment 100, while in other instances, certain elements may be included within or as a portion of one or more of the other described elements, as well as other elements not described in the illustrated implementation. Further, certain elements illustrated in FIG. 1A may be combined with other components, as well as used for alternative or additional purposes in addition to those purposes described herein.

As noted above, a collection of devices, or endpoints, may participate in Internet-of-things (IoT) networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

Figure 1B:
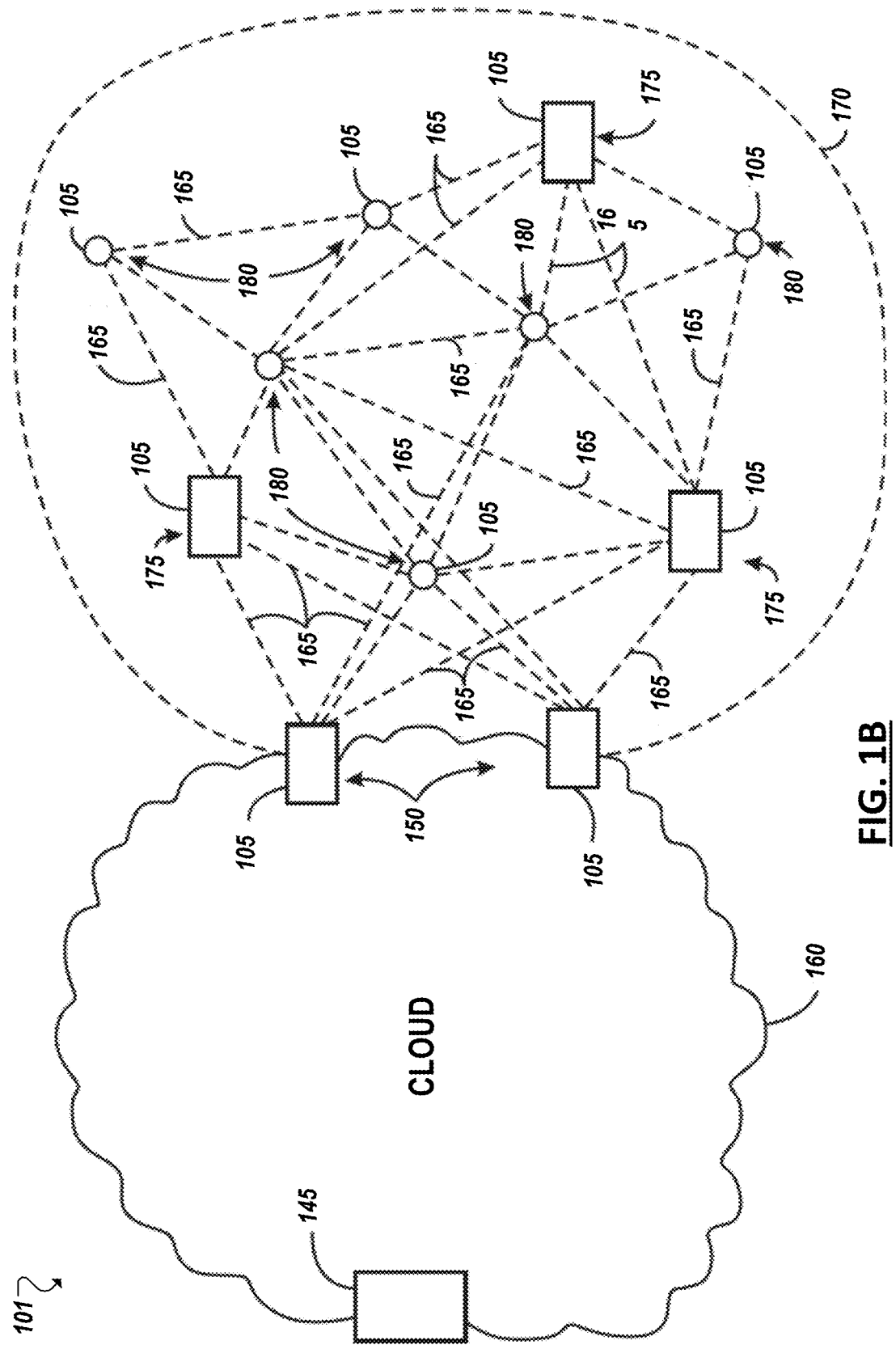
FIG. 1B illustrates an embodiment of a cloud computing network.

As shown in the simplified block diagram 101 of FIG. 1B, in some instances, a cloud computing network, or cloud, in communication with a mesh network of IoT devices (e.g., 105a-d), which may be termed a "fog," may be operating at the edge of the cloud. To simplify the diagram, not every IoT device 105 is labeled.

The fog 170 may be considered to be a massively interconnected network wherein a number of IoT devices 105 are in communications with each other, for example, by radio links 165. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 105 are shown in this example, gateways 150, data aggregators 175, and sensors 180, although any combinations of IoT devices 105 and functionality may be used. The gateways 150 may be edge devices that provide communications between the cloud 160 and the fog 170, and may also function as charging and locating devices for the sensors 180. The data aggregators 175 may provide charging for sensors 180 and may also locate the sensors 180. The locations, charging alerts, battery alerts, and other data, or both may be passed along to the cloud 160 through the gateways 150. As described herein, the sensors 180 may provide power, location services, or both to other devices or items.

Communications from any IoT device 105 may be passed along the most convenient path between any of the IoT devices 105 to reach the gateways 150. In these networks, the number of interconnections provide substantial redundancy, allowing communications to be maintained, even with the loss of a number of IoT devices 105.

The fog 170 of these IoT devices 105 devices may be presented to devices in the cloud 160, such as a server 145, as a single device located at the edge of the cloud 160, e.g., a fog 170 device. In this example, the alerts coming from the fog 170 device may be sent without being identified as coming from a specific IoT device 105 within the fog 170. For example, an alert may indicate that a sensor 180 needs to be returned for charging and the location of the sensor 180, without identifying any specific data aggregator 175 that sent the alert.

In some examples, the IoT devices 105 may be configured using an imperative programming style, e.g., with each IoT device 105 having a specific function. However, the IoT devices 105 forming the fog 170 may be configured in a declarative programming style, allowing the IoT devices 105 to reconfigure their operations and determine needed resources in response to conditions, queries, and device failures. Corresponding service logic may be provided to dictate how devices may be configured to generate ad hoc assemblies of devices, including assemblies of devices which function logically as a single device, among other examples. For example, a query from a user located at a server 145 about the location of a sensor 180 may result in the fog 170 device selecting the IoT devices 105, such as particular data aggregators 175, needed to answer the query. If the sensors 180 are providing power to a device, sensors associated with the sensor 180, such as power demand, temperature, and the like, may be used in concert with sensors on the device, or other devices, to answer a query. In this example, IoT devices 105 in the fog 170 may select the sensors on particular sensor 180 based on the query, such as adding data from power sensors or temperature sensors. Further, if some of the IoT devices 105 are not operational, for example, if a data aggregator 175 has failed, other IoT devices 105 in the fog 170 device may provide substitute, allowing locations to be determined.

Further, the fog 170 may divide itself into smaller units based on the relative physical locations of the sensors 180 and data aggregators 175. In this example, the communications for a sensor 180 that has been instantiated in one portion of the fog 170 may be passed along to IoT devices 105 along the path of movement of the sensor 180. Further, if the sensor 180 is moved from one location to another location that is in a different region of the fog 170, different data aggregators 175 may be identified as charging stations for the sensor 180.

As an example, if a sensor 180 is used to power a portable device in a chemical plant, such as a personal hydrocarbon detector, the device will be moved from an initial location, such as a stockroom or control room, to locations in the chemical plant, which may be a few hundred feet to several thousands of feet from the initial location. If the entire facility is included in a single fog 170 charging structure, as the device moves, data may be exchanged between data aggregators 175 that includes the alert and location functions for the sensor 180, e.g., the instantiation information for the sensor 180. Thus, if a battery alert for the sensor 180 indicates that it needs to be charged, the fog 170 may indicate a closest data aggregator 175 that has a fully charged sensor 180 ready for exchange with the sensor 180 in the portable device.

With the emergence of Internet of Things (IoT) system, it is anticipated that over 50 billion devices will be available to be interconnected by the year 2020, potentially enabling enormous and world-changing opportunities in terms of technology breakthrough and business development. For instance, in home automation systems, automation of a home is typically increased as more IoT devices are added for use in sensing and controlling additional aspects of the home. However, as the number and variety of devices increase, the management of "things" (or devices for inclusion in IoT systems) becomes outstandingly complex and challenging.

One of the major obstacles preventing the adoption of IoT systems is the reality that many of the various (and sometimes special purpose) IoT devices may be rather unreliable in the following aspects:

Some devices are to be operated in harsh environments. Sensor readings can drift in extreme environments, e.g., at 120 degree Fahrenheit, in a rainy day, etc.;

Devices may be per se unreliable. Many IoT devices are designed for consumers, which may imply lower cost, lower durability, and lower overall reliability;

Some devices run on unreliable power sources. Many IoT devices, to preserve their mobility and flexibility of deployment, utilize battery power (e.g., in the absence of a convenient or consistent wired power source), leading to reliance on battery lifespan for reliably device performance;

Unreliable network connectivity. As many IoT devices may be deployed beyond the reach of a wired network connection, wireless network connectivity is relied upon, which may sometimes be unreliable and intermittent; among other examples.

All of the above issues may lead to unpredictable or anomalous sensor readings, e.g., value drifting, random value, null value, etc., which hereinafter may be referred to as "anomalies" or "outliers".

Compounding the issues affecting some IoT devices is the heterogeneity of IoT systems. Even if some of the IoT devices are designed, manufactured, and deployed in a manner that addresses some of the issues above, it remains likely that other devices in the network may not be of the same quality. In implementations where applications are constructed through the interoperation of these several systems, it may be desirable to configure the system to identify those devices that are underperforming and compensate by relying more heavily on the devices that are less affected.

In one example, an IoT system may be configured to implement a machine learning model utilizing the combined resources of multiple devices in the system. Such a model may be utilized in a variety of contexts, including analysis of the data generated (e.g., by device sensors or compute resources) or received at the devices implementing the model. For instance, anomaly events (such as those introduced above) may also be detected utilizing such models. For example, the embodiments described herein may be according to one or more principles or features described in U.S. patent application Ser. No. 15/283,308, filed Oct. 1, 2016, and incorporated by reference herein in its entirety.

Random forests may form the basis effective ensemble learning algorithms. For instance, random forests may be used to implement distributed classification where data is sourced from multiple distributed devices (including devices of different types, manufacturers, and models), such as in the context of the Internet of Things (IoT), wireless sensor networks (WSNs), machine-to-machine (M2M) network, fog systems, etc. For example, one of the devices in a network (e.g., an IoT, WSN, M2M, or other network) may be designated as or otherwise act as a decision maker within the network and can include logic to make determinations based on decision trees hosted on and utilized by (multiple) other nearby devices. The determination may correspond to a local decision about whether or not an event has happened, e.g., failure of a device, a device malfunction, an event in the environment of the device, among a variety of other examples. Additionally, in some implementations, such as dynamic IoT networks the devices themselves may be moving (e.g., a network of drones, a network composed of sensors within one or more automobiles, a network that includes at least one (autonomous or manually) movable device, etc.). Maintaining functionality of classification on each of the devices in such a distributed network may involve continued communication and exchange of data to keep devices apprised of changes and information at their neighbors, however, constant exchange of data can place heavy demands on the device's battery and result in a bottleneck in use of corresponding distributed machine learning algorithms in the context of IoT, WSNs or M2M networks. Random forests may be used, such that individual decision trees in the random forest may be exchanged between the various network devices to integrate intelligent from neighboring device into a local model.

In some implementations, distributing a random forest between multiple devices may undermine the precision or trustworthiness of decisions generated using a corresponding random forest-based solution, as a result of some of the variations between devices implementing the random forest. For instance, the votes returned by the various devices from their respective portions of the random forest may not be of the same quality. Varied devices in a network may be heterogeneous, may be deployed in varied environment, have diverse trust levels, be of varying quality (e.g., in the quality of data they produce, quality of features they possess, etc.) among other variations. Further, in some implementations, as decision tree models are continuously exchanged by devices in a network (e.g., as other devices are added to the network or as new models are developed at or for a respective one of the devices), the number of decision tree models on any given device may likewise continuously increase. In some implementations, a management system and functionality may be provided to manage the distribution of decision trees within a random forest. In one example, the management system may utilize entropy-based weighting of decision trees within the random forest for ensembling and model management, so as to discriminate importance/usefulness of decision trees from one another, and potentially filter out (e.g., remove) those trees of lower weight.

As noted, random forest-based learning solutions may be utilized and managed for classification within distributed systems, including networks where the composite devices are mobile, diverse, relatively unreliable, deployed in diverse environments. As noted above, in one example, generalized entropy of individual decision trees may be determined and considered as the basis for weighting decision trees in a random forest. Such weightings may form the basis of voting when aggregating decisions of trees in the random forest and managing collections of decision trees in random forests, among other example uses. Such weighting may be applied to random forests implemented to perform distributed online classification within a given system or network in which various devices are deployed. Based on the learned weighting, online classification of a sample may be performed by aggregating decision trees from a collection of devices under the theoretic foundation of generalized entropy.

An entropy based ensemble, such as employed in the learning solutions discussed herein, may realize enhanced accuracy and robustness, among other example advantages. For instance, traditional random forest models employ uniform voting, which can be problematic when decision trees are distributed among devices of diverse capability and trust level. For example, when data and decision trees are spread out among multiple devices, some data sources (and, in turn, their models) can be outstandingly unreliable. By utilizing a generalized entropy based weighting, which may be learned in an unsupervised manner (e.g., learning automatically the weights of decision trees without dedicated training data), deficiencies and variations in the individual devices and/or their decision tree models may be considered during the voting of the random forest. Further, such weightings may result in random forests that are particularly robust against the nature of heterogeneity in the context of IoT. When information is shared continuously among devices, the model may be further adapted based on real time data. In the context of random forests composed of potentially ever-increasing number of decision trees, the proposed generalized entropy may also provide an effective means to manage a bounded set of models by estimating the usefulness of models and throwing away aged or low quality (e.g., low weighted) models in an unsupervised manner. Indeed, the learned weightings of decision trees in a random forest may be used to maintain a priority queue for disposal of useless (or comparatively less useful) decision tree models. In some cases, the number of trees within a random forest may be bounded, making the use of such weightings useful in keeping the most valuable decision trees in the random forest and excluded those with lower weightings.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple IoT devices (e.g., 105c,d) with assets (e.g., sensors (e.g., 110c) and/or actuators (e.g., 115a)) capable of being used in a variety of different IoT applications. In the example of FIG. 2, a management system 205 is provided with deployment manager logic 206 (implemented in hardware and/or software) to detect assets within a location and identify opportunities to deploy an IoT system utilizing the detected assets. Deployment can involve automatically identifying and configuring detected assets to participate in a new or ongoing IoT application deployment. During deployment, or runtime operation of an IoT application, anomalies may occur at any one of the devices (e.g., 105b,d) deployed in the IoT application. Accordingly, a system 200 may be provided with functionality to effectively detect and trigger resolution of anomalies within an IoT system.

In one example, at least a subset of the devices within an IoT or WSN system (e.g., a system where multiple devices are working in concert to provide one or more particular services or results) may include functionality for classifying data, at the device, based on a machine learning model. For instance, the model may be utilized to classify data generated by one or more sensors as either anomalous or normal data, among other example classifications (e.g., object detection, object tracking, pedestrian detection, etc.). The model may be particularly useful in solving classification problems involving imbalanced distribution of the data, among other examples. The data to be classified by the model may be data generated by one or more sensors (e.g., 110a, 100c) of the device (as they sense the environment corresponding to the device 105c,d), data describing a state or action performed in connection with one or more actuators of the device (e.g., data describing an "open," "on," "close," or other condition), data generated for a user interface of the device (e.g., 105b,d), data generated by computing resources (e.g., 216, 217) and/or activity logic (e.g., 225, 226) executed on the device (e.g., 105c,d) (e.g., to process sensor data, actuator state data, or other data locally at the device to realize a further outcome or activity at the device, etc.), among other potential examples.

In the particular example of FIG. 2, a device (e.g., 105c,d) may include one or more data processing apparatus (or "processors") (e.g., 216, 217), one or more memory elements (e.g., 218, 219), one or more communications modules (e.g., 220, 221), a battery (e.g., 222, 223) or other power source (e.g., a solar cell, AC connection and adapter, etc.), among other components. Each device (e.g., 105c,d) can possess hardware, sensors (e.g., 110a,c), actuators (e.g., 115a), and other logic (e.g., 225, 226) to realize the intended function(s) of the device (including operation of the respective sensors and actuators). In some cases, devices may be provided with such assets as one or more sensors (e.g., 110a,c) of the same or varying types, actuators (e.g., 115a) of varying types, computing assets (e.g., through a respective processor and/or software logic), security features, data storage assets, and other resources. Communication modules (e.g., 220, 221) may also be utilized as communication assets within some deployments and may include hardware and software to facilitate the device's communication over one or more networks (e.g., 120), utilizing one or more technologies (e.g., WiFi, Bluetooth, Near Field Communications, Zigbee, Ethernet, etc.), with other systems and devices.

In one example, a device (e.g., 105c,d) may be further provided with data classification logic to utilize a locally-stored machine learning model to classify data generated at or access by the device into one of a set of classifications. In the particular example of FIG. 2, classification logic may be configured for use in anomaly detection, such that a corresponding learning model (e.g., embodied in anomaly detection logic (e.g., 240, 245)) may be used to determine when data generated at the device (e.g., 105c,d) constitutes an anomaly or not (among other examples). In some instances, a random forest-based classification model may be utilized at a device (e.g., 105c,d) to enable online classification of data at the device. In some implementations, a random forest decision model with entropy-based ensemble may be provided, for instance, for distributed classification in IoT or other computing systems of which the device may be a part. The distributed random forest may be implemented in connection with an online unsupervised ensemble approach that provides for management of the random forest to outfit the random forest with a theoretically optimal combination of decision trees based on continuous unlabeled data.

In some implementations, a tree manager 230, 235 may be provided on each of multiple device (e.g., 105c,d) within a system to perform tasks relating to the generation, training, validation, maintenance, and use of decision trees and random forests local to the device (e.g., 105c,d). For instance, in one example, a tree manager 230, 235 may include sub-components such as training logic 250, 252, tree sharing logic 258, 260, tree weighting calculators 262, 264, and tree priority manager 266, 268, among other examples.

In the example of FIG. 2, a tree manager 230, 235 may access decision tree models (e.g., 278, 280) and may train each of the trees 278, 280 using training data 270, 272. The decision trees themselves may be provided, for instance, by one or more management systems 205 or other remote system (e.g., through a model manager 210 of the system configured to provision endpoint or IoT devices (e.g., 105c, d) with various decision tree instances). The training data 270, 272 may be data generated at the corresponding device (e.g., during test or live operation in connection with sensors (e.g., 110a,c), actuators (e.g., 115a), and/or activity logic (e.g., 225, 226) of the respective device). Given that anomalies may be outliers (and not likely to be comprehensively captured in training data 270, 272 (if at all)), to more effectively train the tree models (e.g., 278, 280) training logic 250, 252 may also utilize artificially generated anomaly data (e.g., 274, 276) corresponding to data expected when certain anomalies, device errors, faults, outages, or other issues occur that affect the device (e.g., 105c,d). Anomaly data (e.g., 274, 276) may likewise be generated and provided by an outside source, such as a management system (e.g., 205) or other system (e.g., using an anomaly data generator (e.g., 225)). In other cases, as the anomaly data may be generated from training data (e.g., 270, 272) generated at the device (e.g., 105c,d), an anomaly data generator may instead or additionally be provided locally at the device (e.g., 105c,d) in some implementations.

The tree models (e.g., 278, 280) provided on any one device (e.g., 105c,d) within an IoT or WSN system may represent only a subset of decision trees available to detect anomalies for a device or particular type of device. Indeed, the respective decision tree models (e.g., 278) hosted on a device (e.g., 105c) may be different from the decision tree models (e.g., 280) hosted on other related devices (e.g., 105d). Indeed, sharing logic (e.g., 268, 270) may be provided to identify other devices within a particular IoT application or WSN deployment with decision trees relevant to the device. A device (e.g., 105c) may utilize sharing logic (e.g., 258) to receive related decision trees (e.g., 280) from other devices (e.g., 105d) and further utilize sharing logic to share its own locally trained and developed decision trees (e.g., 278) with other related devices (e.g., 105d). Each of the devices (e.g., 105b,d) may thereby build a random forest model from the trees it develops and receives and utilize this random forest anomaly detection model to classify data generated or obtained at the device (such as the detection of anomalies occurring at the device (e.g., using anomaly detection logic 240, 245)). Classifications determined at the device may then be shared with a management system 205 or other system. In one example, the random forest local to a particular device (e.g., 105c) may be used to detect anomalies in data generated at the device and as these anomalies are detected, corresponding anomaly events may be logged and shared with a management system 205 or other system to trigger an assessment and/or resolution of the anomaly, among other examples.

In one example, a tree manager 230, 235 hosted on a device (e.g., 105c,d) may additionally include tree weighting calculators 262, 264, which may determine a weighting for each tree obtained at the device (e.g., 105c,d) for inclusion in a corresponding random forest. In one example, the weighting value for each of the trees on the device may be based on an entropy value for the tree. The entropy, or generalized entropy, of each tree model may be determined indirectly in an unsupervised manner for each tree (e.g., using the weighting calculator (e.g., 262, 264)) and may represent the usefulness or value (in the ensemble voting) that is attributable to the respective tree model. In some implementations, the entropy may be determined based on any one of Renyi entropy, Tsallis entropy, Abe entropy, Kaniadakis entropy, Sharma-Mittal entropies, among other examples. A weighting value may be determined for each decision tree model based on the respective entropy of the decision tree. The determination of entropy may be based on a set of data fed to the decision tree to make a set of decisions, or classifications. A similar set of data may be provided to other decision trees hosted by the device to allow comparable entropy and/or weighting calculations to be made for each tree. Moreover, when a random forest of decision trees has been implemented on a device and data is provided to each of the trees in the random forest, the weighing calculator may make ongoing calculations of an entropy-based weighting for the respective device, such that a device's weighting value may be continuously refined and even change over time. Weighting determined and maintained for each of the decision tree models (e.g., 278, 280) of a device (e.g., 105c,d), including those obtained from other neighboring devices, may be described and/or embodied in weight data 286, 288 at the respective device (e.g., 105c,d). In some implementations, weight data 286, 288 may also be reported to a management system (e.g., 205) for tracking, quality control, and supplemental processing in some cases. In some instances, a management system (e.g., 205) may utilize weighting data obtained from multiple different devices as feedback of decision tree models provided by the management system and/or for use in improving subsequent decision tree models developed and provided to devices using the management system (e.g., 205), among other examples.

Weightings determined for a collection of decision tree models (e.g., 278, 280) for inclusion (or potential inclusion) in a local random forest mode of a device (e.g., 105*c,d*) may be utilized to refine voting within the random forest model. For instance, the individual votes of each decision tree in the random forest may be weighted in the final decision based on the respective or relative entropy-based weighing of the tree within the forest (e.g., as represented by the corresponding weighting value calculated for the decision tree by the weighting calculator 262, 264). Further, decision tree weighting may be utilized by the tree manager 230 to determine changes to the random forest. For example, a tree manager 230 may include a tree priority manager (e.g., 266, 268), which may be used to determine whether a new decision tree (e.g., received from a management system 205 or another (e.g., new) neighboring device 105*d*) should be added to or replace another tree in the local random forest of the device, determine whether to remove a tree within the random forest, etc. For instance, in some examples, a particular random forest may be capped at a maximum number of constituent decision trees, such that as new trees are shared with the device (e.g., from another device entering the network or the proximity of the device), the priority manager (e.g., 266, 268) may determine whether to add the tree or not. In connection with this determination, the new potential decision tree may be cached at the device (e.g., 105*c,d*) and the weighting calculator (e.g., 262, 264) may be utilized to determine an entropy-based weight value for the new decision tree (e.g., from the same or similar input data utilized in calculating the present weighting values of other trees in the local random forest model). If the weighting determined for the new decision tree meets a particular threshold, is higher than the lowest current decision tree in the random forest model, is a statistically significant improvement over the lowest weighted tree in the random forest model, or satisfies another rule utilized by the propriety manager 266, 268, then the new tree may be included in the random forest model, among other examples. Through continuous weighing and assessing whether a local random forest model may be improved through the addition of new or other decision trees, the random forest model utilized by the device 105*c,d* may be made more robust and decisions (classifications) determined using the random forest model (at the device) may be more accurate, among other example benefits.

In the particular example of FIG. 2, the management system 205 may include one or more processors (e.g., 214), one or more memory elements (e.g., 215), and one or more communication modules incorporating hardware and logic to allow the management system 205 to communicate over one or more networks (e.g., 120) with other systems and devices (e.g., 105*c*, 105*d*, etc.). The deployment manager 206 (and other components) may be implemented utilizing code executable by the processor 214 to manage the automated deployment of a local IoT system. Additional components may also be provided to assist with anomaly detection and reporting in one or more IoT application deployments (including deployments not directly assisted by the management system). For instance, a management system 205 may include components such as an anomaly tracker 215, anomaly model manager 220, and anomaly data generator 225, among other example components and features.

A management system 205 may include a model manager 210 with functionality for assisting in the provisioning and development of decision trees and random forest models incorporating these trees to perform local classification at the device. In some instances, the model manager may merely provide the base decision trees (e.g., 278, 280) to each of the devices 105*c,d*. The model manager 210, in one example, may randomly select a number of decision trees and then distribute these trees to the collection of devices. In some implementations, the model manager 210 may ensure that distribution of the trees is completed so that groups of devices (e.g., that will be sharing decision trees and building random forests from these trees) do not have duplicate trees within the group. In some instances, one or more functions of a tree manager (e.g., 230, 235) may be supplemented by or replaced by functionality of the model manager 210. In some implementations, devices (e.g., 105*c,d*) may provide training data to a centralized management system 205 to allow a centralized model manager 210 to perform training of the decision trees and even, in some cases, determine weightings for the respective decision trees before distributing them to the respective devices (e.g., 105*c,d*), among other example implementations. A management system 205 may additionally include an anomaly data generator 212 to generate anomaly data for use in training of decision tree models configured to determining anomaly data. In implementations where the decision trees are trained at the devices, the anomaly data generator 225 may provide respective anomaly data to various devices that are relevant to the types of anomalies, which may occur on these devices, among other examples.

Continuing with the example of a management system assisting with random forest models configured for detecting anomaly conditions in data generated by various IoT devices (e.g., 105*c,d*) in an examples system, some implementations of a management system 205 may additionally include an anomaly tracker 208 to receive anomaly events and corresponding data from a collection of devices (e.g., 105*b,d*) having local anomaly detection logic (e.g., 240, 245). The anomaly tracker 208 may log the reported anomalies and may determine maintenance or reporting events based on the receipt of one or more anomalies. For instance, an anomaly tracker 208 may include functionality for applying a threshold or heuristic to determine an event from multiple anomalies reported by the same or different (nearby or otherwise related) devices (e.g., 105*c,d*). The anomaly tracker 208 may additionally trigger service tickets, alerts, or other actions based on receiving one or more reported anomalies from the devices (e.g., 105*c,d*).

In some cases, the management system 205 may be implemented on a dedicated physical system (e.g., separate from other devices in the IoT deployment). For instance, the management system 205 may be implemented on a gateway device used to facilitate communication with and between multiple potential IoT devices (e.g., 105*c,d*) within a particular location. In some instances, the management system 205 may be hosted at least in part on a user device (e.g., a personal computer or smartphone), including a user device that may itself be utilized in the deployment of a particular IoT application. Indeed, the management system 205 (and deployment manager 206) may be implemented on multiple devices, with some functionality of the management system 205 hosted on one device and other functionality hosted on other devices. A management system 205 may, in some cases, be hosted partially or entirely remote from the environment in which the IoT or WSN devices (e.g., 105c,d) are to be deployed. Indeed, a management system 205 may be implemented using one or more remote computing systems, such as cloud-based resources, that are remote from the devices, gateways, etc. utilized in a given IoT application or WSN deployment.

As noted above, a variety of machine learning techniques may be applied (e.g., locally at devices of an IoT or WSN system) for use in IoT classification techniques, such as support vector machines (SVMs), random forests, and deep neural networks (DNNs). In cases where random forests are used, efficiencies may be realized that are tuned to the limited processing, storage, and communication capabilities of some devices. For instance, random forests tend not to utilize significant amounts of data (e.g., like DNNs), random forests are robust against outliers, random forests are efficient and work well within real time applications (e.g., applications involving localization) and random forest models may be easily implemented as online algorithms, among other potential example benefits.

A random forest is an ensemble model based on a collection of decision trees. Localized learning may be beneficially implemented using random forest-based models as random forests are typically robust against outliers (e.g., unlike traditional support vector machine (SVM) algorithms which often use additional outlier detection), are efficient allowing use in real time applications (e.g., like localization), and can be readily implemented as online algorithms, among other example advantages. A random forest may be considered an ensemble model based on multiple decision trees. Ensemble is a machine learning technique that combines results from different models to derive improved results over any one of the models in isolation. For instance, an ensemble may include a voting algorithm, in which each model provides a vote and a majority, plurality, mean, or median vote may be adopted as the aggregate result of the collection of models. In the example of random forests, the ensemble may be composed of multiple decision trees. In some cases, different trees may be hosted on different devices in a network. In some implementations, each decision tree may be trained by sub-sampling (e.g., random selection of training samples) and sub-featuring (e.g., random selecting training features), to ensure that sufficient variety exists in the various decision trees implementing a proposed random forest model (e.g., to improve the results derived through the ensemble).

Training a decision tree can involve randomly selecting features to assist in reducing the amount of generated positives in training time. Indeed, through sub-featuring, the size of the training data domain may be reduced, leading to a smaller number of possible outliers (that would be present in the original data domain). Accordingly, parameters may be selected to indicate the number of features to be used when training a decision tree. Random selection of features may thereby reduce the amount of generated positives samples in the training time. Further, outlier, or anomaly data, generation may be performed using potentially any data set generated from a corresponding device. Additionally, bagging may provide for improved robustness against the potential noisiness of a dataset. For instance, it is possible that the training set (which is assumed to be entirely normal), actually includes one or more data instances, which are actually anomalies. Through bagging, a device will only train a subset of the decision trees that will be ultimately included in the random forest used for anomaly detection. The remaining trees may be received from other nearby or otherwise related devices through an exchange of trees. These other trees, would not be trained using the same training set (but would instead utilize the training set of data generated at the device from which the tree originates, and thus would not be trained based on the noise data. Indeed, any noisy data in a training set (e.g., should it reappear in testing data) may be classified as an anomaly by these other received trees, even though the noisy data was treated as an inlier during training of the corresponding device's own trees.

In some implementations, a random forest decision model with entropy-based ensemble may be provided, for instance, for distributed classification in IoT or other computing systems. The distributed random forest may be implemented in connection with an online unsupervised ensemble approach that provides for management of the random forest to outfit the random forest with a theoretically optimal combination of decision trees based on continuous unlabeled data.

Figure 3:
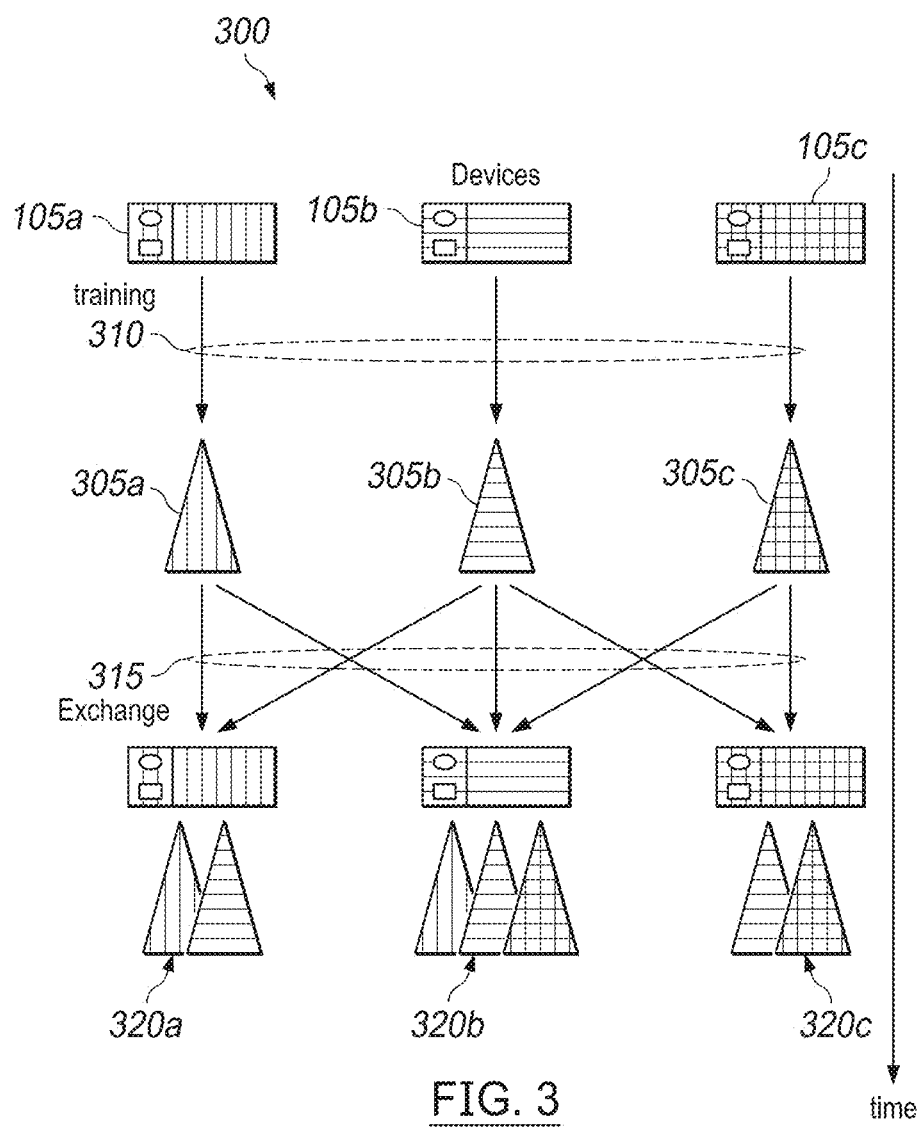
FIG. 3 is a simplified block diagram illustrating a flow for the development of an example random forest model.

FIG. 3 is a simplified block diagram 300 illustrating an example of distributed random forests developed on each of multiple devices within a system. In this example, a number of devices (e.g., 105a-c) are provided, which may be interconnected over one or more networks (e.g., an WSN or IoT network). Each device 105a-c may be provided with one or more decision trees (e.g., 305a-c), each decision tree adapted for a particular type of classification. For instance, each decision tree may be adapted for anomaly detection in data generated by one or more sensors at each respective device (e.g., 105a-c). The local decision trees (e.g., 305a-c) may be provisioned on the devices by one or more management system or may be pre-loaded on the device (e.g., 105a-c), among other examples. In some implementations, each device may train (at 310) its respective decision tree, for instance, using data generated at the device by its respective sensors or logic. In some implementation, data used in training of the decision trees (e.g., 305a-c) may be supplemented by a management system, another device, a training data store, among other examples.

Distributing training 310 of multiple different decision trees across a network of devices (e.g., 105a-c) may make more optimal use of the sometime limited computing and memory capabilities of the devices. Instead of having a single device (e.g., 105a) obtain and train all of the decision trees that it will include in its local random forest classification model, the device can leverage its neighboring devices and decision trees trained at each respective neighboring device. In this manner, a device may build a local random forest in a "distributed" manner. For instance, after training 310 its local decision tree, the device (e.g., 105b) may exchange 315 trained decision trees with other neighboring devices (e.g., 105a,c) such that each device receives the trained decisions tree(s) from its neighboring devices and supplements its own trained decision tree (e.g., 305b) with those received from the neighboring devices to build a local random forest model (e.g., 320a-c) from its ensemble of decision trees. While multiple devices may be deployed or operate in the same network, it should be appreciated that some devices may have different collections of neighbors and the respective collection of decision trees assembled for the device's random forest may vary (e.g., depending on the device's respective neighbors). In other examples, neighbor relationships within a network may be all-to-all, such that each device in the network shares (e.g., 315) its trained decision trees with every other device in the network and each device may acquire the same collection of decision trees to implement its respective random forest model (e.g., 302a-c), among other examples.

Figure 4:
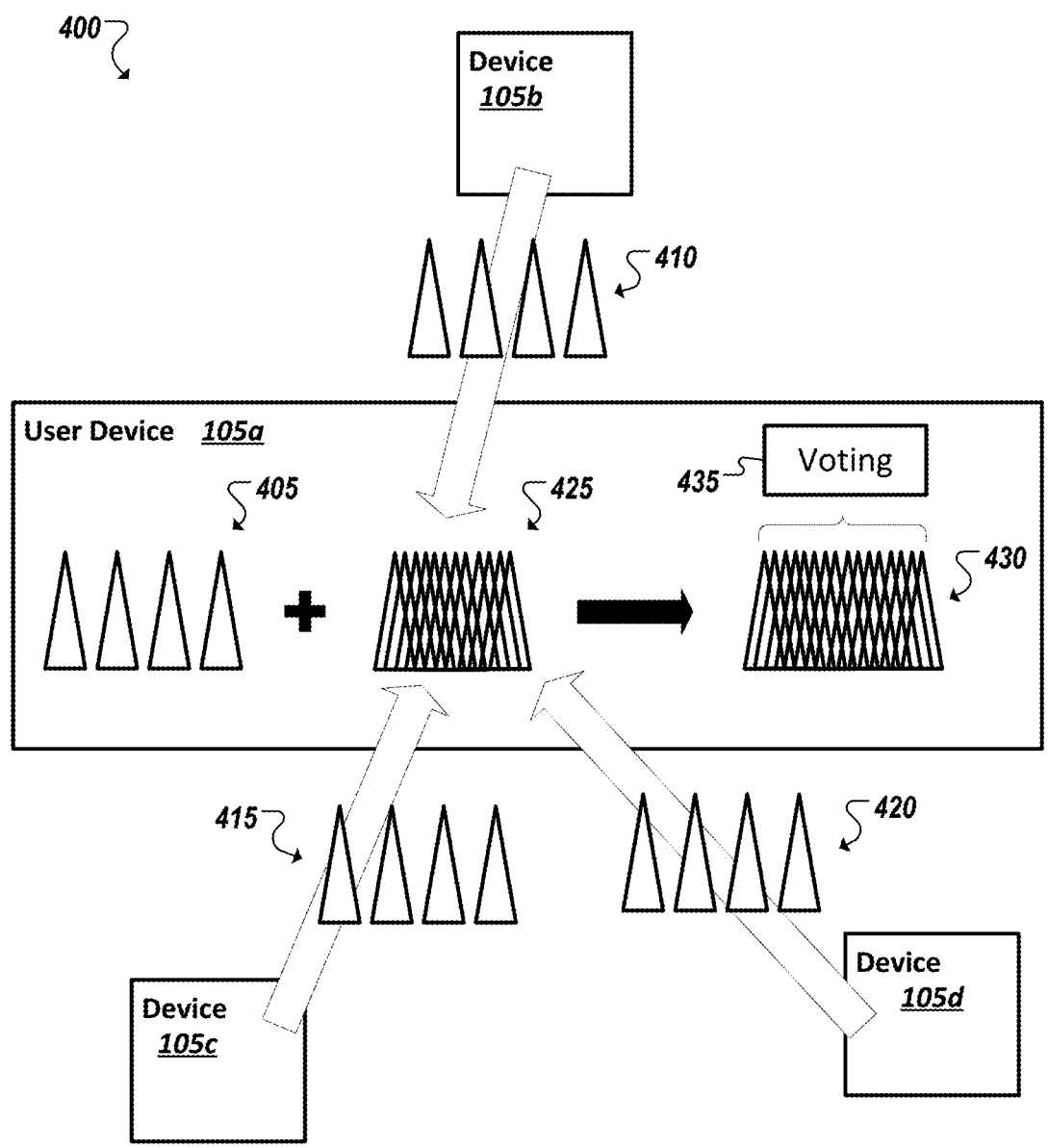
FIG. 4 is a simplified block diagram illustrating decision tree sharing within an example machine-to-machine system.

Turning to FIG. 4, a simplified block diagram 400 is shown illustrating the development of an example random forest at a device (e.g., a sensor or actuator device in a larger WSN or IoT system). The device 105a may be provided with a set of decision trees 405, which the device 105a is responsible for training using training data generated at the device 105a. In some cases, the set of (untrained) decision trees 405 may be received by a backend management system or other remote source. In other cases, the device itself may include functionality (e.g., embodied in modules implemented in hardware and/or software) to generate the set of decision trees 405. The device 105a may utilize this training data together with anomaly data to train the set of decision trees 405.

As noted above, in some implementations, training a random-forest based classification model may involve distributing responsibility for training the set of decision trees of a random forest between multiple different devices (e.g., for which the particular set of decision trees is relevant). For instance, to train a decision tree, a training data set corresponding to a device may be subsampled and sub-featured and outliers may be generated from the training set. A decision tress model may be trained using the combined set of training data and outlier (or anomaly) data. One or more decision trees (e.g., 405, 410, 415, 420) may be trained on each of multiple related devices (e.g., 105a-d), with each device training its respective decision trees using training data generated at the corresponding device. In some cases, multiple decision trees may be trained on a single device, such that the training steps are repeated multiple times to train a set (or potentially multiple sets) of decision trees (e.g., 405, 410, 415, 420). Once the set of decision trees are trained, a device (e.g., 105a) may receive over a network the trained sets of decision trees (e.g., 410, 415, 420) of other related devices (e.g., 105b-d). The device may also send a copy of its set of trees (e.g., 405) to each of the other related devices in the network. With its own trees (e.g., 405) and those from its neighbors (e.g., 425 (representing the aggregate trees 410, 415, 420)), each device may then have a "complete" set of decision trees from which to build its own random forest model 430 now.

To determine a classification (e.g., anomaly) result for a data instance, the data instance may be provided to the model for voting 435 using the collection of decision trees. A random forest can be composed of multiple different decision trees, with each decision tree composed of a unique set of decision nodes. Each decision node can correspond to a test or conditional evaluation of a particular feature or value of a data instance. The result of each decision node can cause an evaluation at another subsequent node on corresponding branches of the tree, until a leaf node is reached. For instance, a data instance (e.g., a single value or collection or vector of values) generated at a device (e.g., 105a) may be fed to a root node of each of the trees in the random forest model 430. The results of each node propagate toward the leaf nodes of the trees until a decision is made for that data instance at each decision tree in the random forest 430. The final determination or prediction may be based on the combined decisions of the decision trees, or a vote, in the random forest model 430. In some cases, a mean or median of the decision tree results may be evaluated (e.g., against a threshold determined for the forest model) to determine a classification for the data instance (e.g., determine whether the data instances constitutes an anomaly or not).

As illustrated in the example of FIG. 4, the training and development of decision trees for incorporation in a random forest-based model may be distributed among multiple devices. In some instances, upon training the device's local decision trees, the device may exchange its trees with other related devices to develop a random forest from the collection of decision trees. For instance, in the simplified block diagram 500 shown in FIG. 5, a collection of devices 105a-k may be present in an environment. In one example, the devices 105a-k may each be deployed in a particular IoT or WSN application such that at least portions of the devices 105a-k may be interconnected, interoperate, and/or intercommunicate (in accordance with the IoT application) to deliver particular outcomes or services. In some cases, the collection of devices 105a-k may include a variety of different devices. For instance, device 105a may be a first type of device with respective sensors and/or actuators, logic, and functionality, while device 105k is a second type of device with different sensors and/or actuators, logic, and functionality. Both types of devices may be deployed in a given IoT application implementation and perform important roles within the deployment. However, each type of device may generate different types of data, or data instances. Accordingly, decision trees models generated for a first type of device may not be adapted for classification of data generated at other types of (neighboring) devices (e.g., anomalies in data of one device may be different from anomalies in data of another different device, etc.). In still other examples, one or more of the "devices" discussed herein may actually be a collection of discrete physical devices in communication and operating as a single logical device (e.g., being banded together to collectively perform a particular function and capable of being later disbanded to operate as independent devices), among other examples.

In a distributed random forest-based anomaly detection model scheme, random forests may be developed to allow anomaly detection at any one of the set of devices in the system. Decision trees included in one random forest may be configured to predict anomalies appearing in data generated by a first type of device. These decision trees, however, may not be capable of predicting anomalies in data generated by other types of devices. Accordingly, in distributing the training and generation of a particular random forest corresponding to a particular type of device, a device (or management system) may first determine which devices (e.g., 105a-k) should share decision trees with which other devices in the network. The less related devices are, the less relevant decision trees will be that have been developed for and trained by these devices. Accordingly, in one example, a device (e.g., 105a) may detect other devices (e.g., 105b-e and k) in the network and communicate with the devices to discover the capabilities or type of each device. In some instances, the device may additionally query an outside system (such as a management system for the IoT application) to determine the type of neighboring devices. For instance, the device may discover a MAC address, model number, or other information about a neighboring device and provide this information to an outside system in a query. The outside system, in response, may identify to the device the type of one or more of its neighboring devices, from which the device 105a can determine whether the device 105a can collaborate with the other device(s) to generate a random forest for use in anomaly detection at the device 105a. In other cases, the device (e.g., 105a) may determine locally which neighboring devices to exchange decision trees with for generating a random forest. For instance, the device may discover capabilities or type of a device based on communications exchanged in a discovery protocol of the network. In still other examples, a management system (e.g., responsible for deploying the IoT application) may determine groupings of devices in which decision trees should be exchanged and may communicate these group assignments to the individual devices (e.g., 105a-k) to identify which other devices each individual device should exchange decision trees with the support the development of corresponding random forest models, among other examples.

Physical proximity and other characteristics may be considered in determining which devices to exchange decision trees with. For example, in FIG. 5, it may be determined that a device 105a is to collaborate with devices 105b-e, such that device 105a shares its trained decision trees with each of devices 105b-e and receives shared decision trees from each of devices 105b-e. In one example, it may be determined that each of devices 105a-e both possess similar functionality to generate sufficiently similar data instances (e.g., from similar combinations of sensors, actuators, activity logic, etc. on the devices 105a-e) and are positioned within similar environments. On this example basis, it may be expected that decision trees developed for and trained using this set of devices (e.g., 105a-e) maybe sufficiently similar and relevant to each of the devices. Accordingly, a determination may be made (at the device 105a or a remote management system, etc.) that device 105a should exchange decision tables with devices 105a-e to generate a random forest usable to classify data at the device 105a.

In some cases, criteria may be defined for determining whether a device should share its decision tables with another device or not. The criteria may indicate a level of similarity in the functional attributes of the devices, such that the decision trees maintained at each device produce decisions for comparable data instances. In some cases, the criteria may require that the devices are discrete instances of the same device or device type. In the case of device type, the devices may nonetheless be different, albeit sufficiently similar devices (e.g., different models, vendors, have some non-overlapping functional features, etc.). In general, the criteria may additionally specify environment attributes to be shared by the devices. For instance, anomalies affecting a device in one environment (e.g., a harsh outdoor environment) may not affect a different instance of the same device in another environment (e.g., an air-conditioned indoor environment). Further, anomaly detection models may be less applicable to devices that are not in close physical proximity and criteria may additionally dictate that devices that share decision trees should be within a defined proximity of the other (e.g., in a common physical environment). In some cases, proximity may be determined based on the ability of devices to communicate with each other (e.g., based on whether the other devices are within a limited wireless range of the device). In other cases, proximity may be determined from global positioning or other localization information determined for the devices. In general, criteria may be determined such that the decision trees maintained and trained at two or more different devices are sufficiently related such that each may be reliably used by other devices to predict anomaly events affecting data generated as the device.

Figure 5:
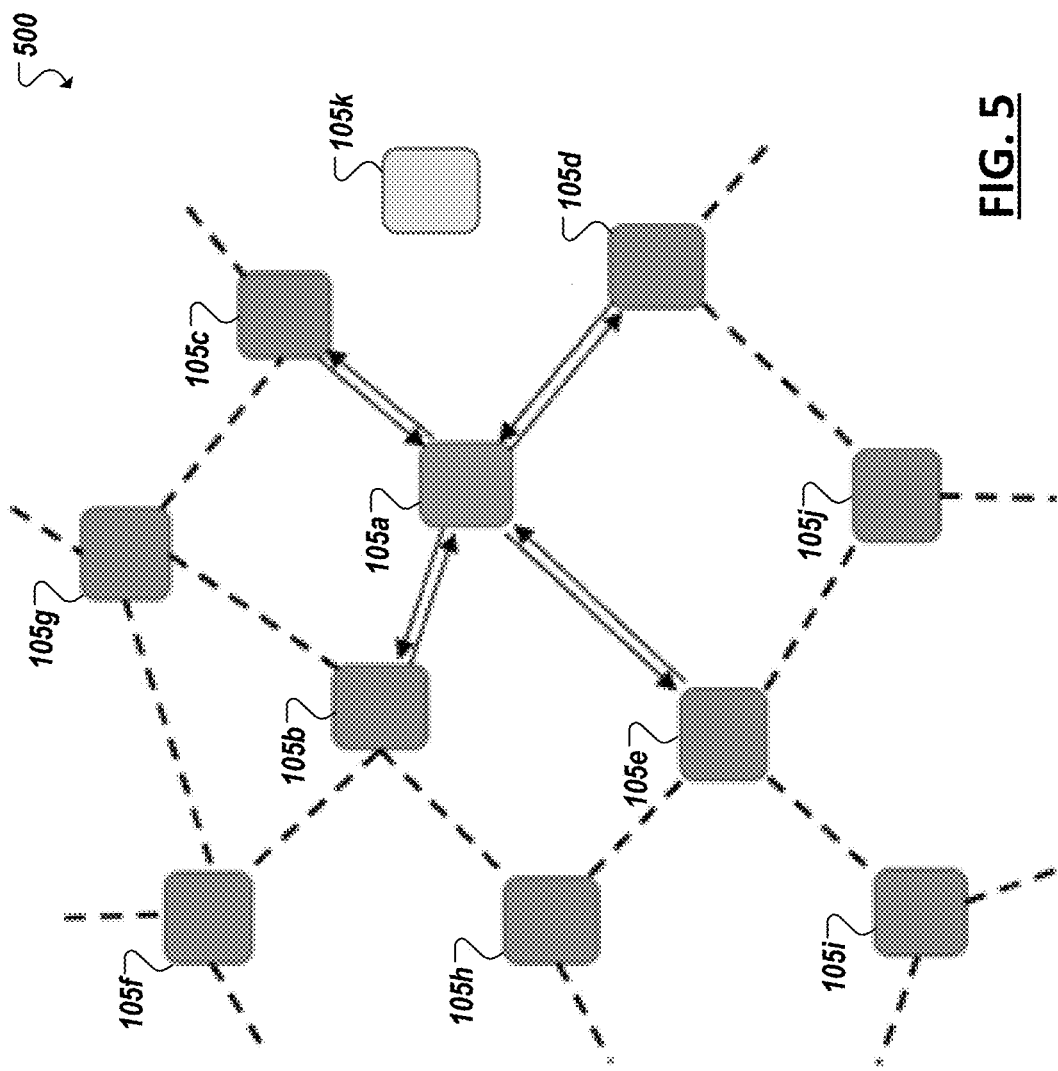
FIG. 5 is a simplified block diagram illustrating an example of a distributed framework for developing random forest-based models.

Continuing with the example of FIG. 5, while proximity may be utilized to determine that device 105a is to share its decision tables with nearby devices 105b-e, other devices (e.g., 105k) in close proximity to device 105a may be excluded from such sharing based on the device (e.g., 105k) being functionally different (or of a different type) than devices 105a-e. Likewise, devices (e.g., 105f-j) that are instances of the same device model or device type, but that are deployed in a sufficiently different environment or not in proximity (e.g., communication range) of device 105a may also be excluded from sharing decision tables with device 105a. In some implementations, devices may be grouped for decision tree sharing. In other cases, each device may identify its own set of companion devices with which to exchange decision trees. For instance, while device 105c exchanges decision trees with device 105a, it may not necessarily exchange decision trees with other devices (e.g., 105b, 105d, 105e) with which device 105a shares. Further, in some implementations, some devices (e.g., 105c) may share decision tables with fewer companion devices (e.g., three) than others (e.g., 105a, which share with four), and as a result, the random tree model generated by some devices may be larger (e.g., incorporating more shared decision trees) than others. In some cases, some devices may host, train, and contribute larger numbers of decision trees than other devices, among other alternative implementations and features.

Random forest-based anomaly detection models may be initially generated in connection with a deployment of an IoT or WSN system. In some cases, the initial training of decision trees, decision tree exchange, random forest generation and validation may take place following a duration after deployment of the M2M system, to allow training and validation data to be developed for each of the participating devices. After corresponding random tree models have been generated, these trees may be used for a duration, before the composite decision trees are to be retrained to reflect any changes to the system (and anomaly distribution of each device and its corresponding environment). In one implementation, a first interval may be defined at which new updated training data is to be developed (from operation of a device) and used to retrain or supplement the initial training of the decision trees delegated to that device for training. A second interval may be defined at which an exchange of updated decision trees may be completed (e.g., following the updated training of the decision trees at the corresponding devices). Likewise, random forests resulting corresponding to the updated training data and training may be re-validated and new weightings and thresholds determined for each instance of the random forests. In some cases, subsequent decision tree exchanges may involve newly added devices, which may potentially contribute trained decision trees not previously included in the exchange (and resulting random forests), among other examples. In general, decision trees (and their corresponding) may be continuously updated and re-shared (e.g., at defined intervals) to allow continuous improvement and updating of the resulting random forest anomaly detection models.

While generating decisions using a random forest may be efficient and effective when implemented in theory on a generic system, the management and ensemble for decision trees in distributed random forest may be difficult tasks in practice, for instance, due to the heterogeneity of devices implementing the random forest and the real world failures of devices participating in the random forest. Where devices have heterogeneous quality and reliability, or where one of the devices providing trees in the random forest fails, corresponding parts (e.g., trees) of the random forest decision tree models may become effectively useless in local classification. Further, in IoT and M2M systems where one or more of the devices are mobile, the "neighbors" of any such device may change over time as a device or its neighbors move, as a new neighbor device enters the network, as a previous neighbor device departs the network, etc. In accordance with these changes, a particular device may receive various new tree models for incorporation in a random forest, but may know little about the source of these tree models (e.g., the trust level of the device, the reliability of the device, etc.).

For instance, in one example, a set of moving devices $D=\{d_i: i=1 \ldots n\}$ may be provided on which a respective set of decision trees $T_{i1}, \ldots, T_{iB}$ has been provisioned (e.g., to contribute decision votes to a random forest built from the collective decision trees of the multiple devices). In some instances, the other decision trees of neighboring devices $T_{i1}^t, \ldots, T_{iN}^t$ may change over time t (e.g., due to changes at the device, a change in the environment measured by the device, a change in location of the device, etc.). Based on data processed by the various decision trees (and their respective decisions) entropy-based weightings may be determined for each decision tree classifier (e.g., from newly collect data $x_{it}$ at time t). These weightings may then be used to form a weighted ensemble using the set of all decision trees on device i improve the accuracy of predictions produced using the decision trees.

Figure 6:
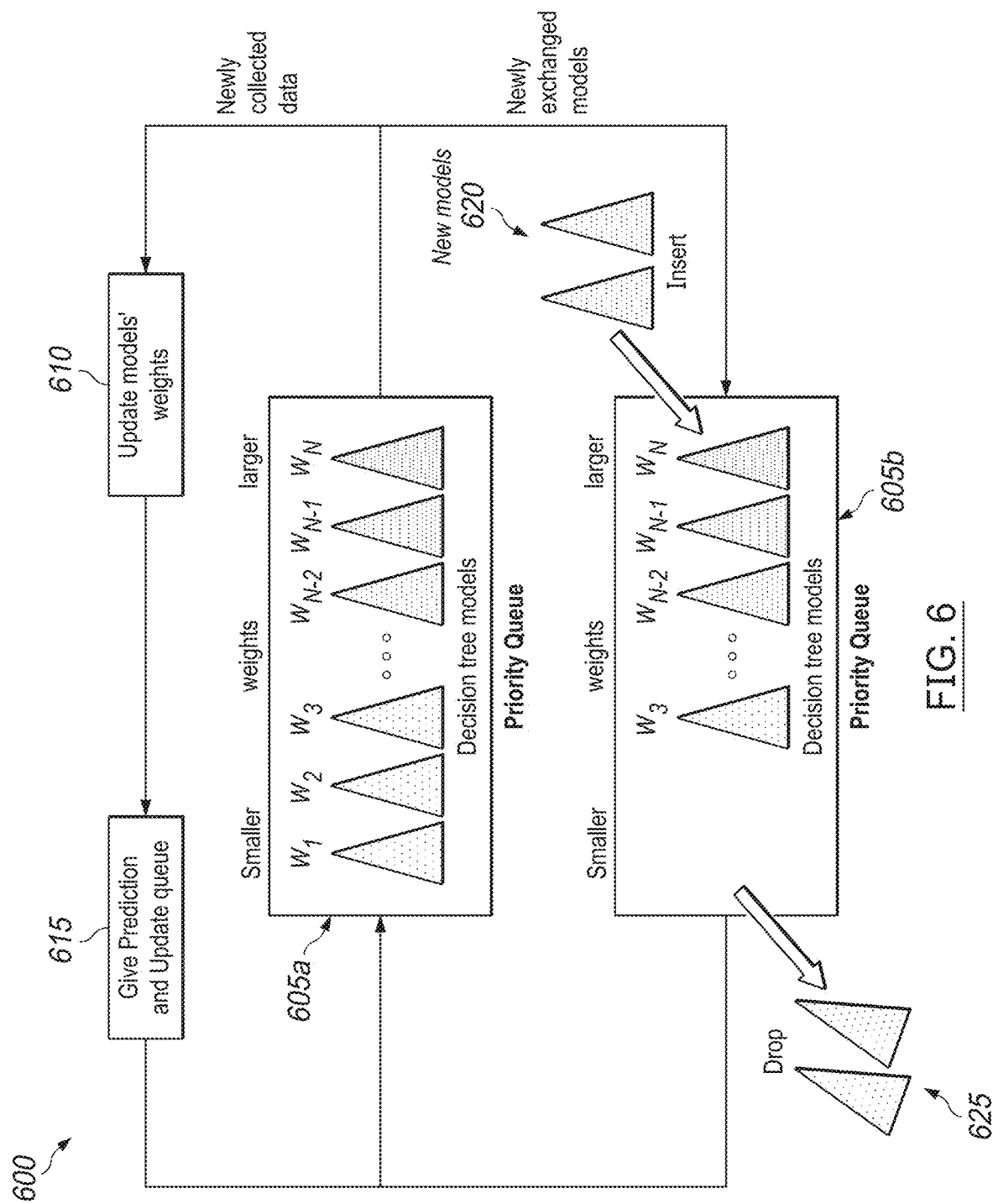
FIG. 6 is a simplified block diagram illustrating a flow for the development of an example random forest model utilizing entropy-based decision tree weighting.

An implementation that utilizes a weighted ensemble, such as described herein, may resolve some of the above concerns and other example issues. Such weighted ensembles may be further paired with a priority queue to manage tree models. For instance, as shown in the example of FIG. 6, a simplified block diagram 600 illustrates an example flow for the continuous weighting and management of a local random forest on a device in an M2M network. In this example, a collection of decision trees (e.g., 605a) may have been assembled (e.g., through exchanges with other neighboring devices) for inclusion in a local random forest model to be used by a particular device to perform classification predictions on data generated by the particular device. In this example, an entropy-based weighting value has been determined for each of the decision trees in the collection 605a. The respective weighing values may be tracked by the particular device as the weighting values are calculated, and may use these weightings to prioritize, rank, or queue the decision trees based on their weights, with the decisions trees having higher weightings afforded a higher priority, or place in the queue, and decisions trees with the lowest weighting values placed at the bottom of the queue. Such a queue, or ranking, may form the basis of maintaining stable performance of the random forest over time.

As new data is generated by a particular device using sensors, the particular device may use the new data to update the entropy-based weight values for each of its decision trees. For instance, the newly generated (or collected) data may be provided as inputs to each of the decision trees in a local random forest 605a to generate respective predictions (of a classification) for the new data at each decision tree. The various decisions derived by the respective decision trees may be utilized to determine the entropy of each of the decision trees in the random forest. The respective entropy of each decision tree (based on the processing of the newly obtained data (e.g., generated by one or more sensors within a particular time interval or time step)) may form the basis for a weighting value calculation for each decision tree. This new weighting calculation may be the basis for updating (at 610) the respective weighting values of each of the decision trees in the current random forest 605a. In some implementations, the newly calculated weighting may replace a previous calculated weighting. In other implementations, the newly calculated weighting may be combined with the previously calculated weighting(s) (e.g., using an average or weighted average) to determine an updated weighting value calculation for each decision tree model based on the new date. In still other examples, multiple instances of data (and corresponding decision tree decisions) may be utilized together to determine an entropy-based weighting value for each decision tree. For instance, a window of data instances (e.g., collected over a time or time stamps $t_1$ to $t_n$) may be utilized to determine the entropy and the entropy-based weighting of each of the decision trees. The window may be a rolling window such that, as new data is generated (e.g., at $t_{r,1}$), the window shifts to include the new data and decisions and exclude the oldest data and decision (e.g., to form a new window corresponding to data collected over $t_2$ to $t_{n+1}$, etc.). With the weightings updated based on the new data, the newly updated weighting values may be used to weight the decisions, or votes, contributed by each tree to the random forest and its aggregated decision (at 615). In this manner, weightings of the decision trees, and the random forest itself, may be continuously adjusted and enhanced based on the data being generated at the particular device. Similar continuous re-weighting may be performed by other devices within the same system.

In some cases, new decision tree models 620 may be offered to or received by the particular device. Such new models 620 may be provided, for instance, by a new device entering an IoT system and providing its trained decision tree models to its new neighbors. In other instances, a management system or other source may identify or develop new decision trees and push these trees to various devices within the system. In still other examples, a device may determine that the weighting values of one or more of its component decision trees may be undesirably low (e.g., below a certain threshold value, following outside a standard deviation of the weightings of other decision trees in its random forest, etc.) and request additional, potential substitute decision tree models to be sent to the device for the device to evaluate to determine whether these can replace underperforming trees in the device's random forest, among other examples.

Continuing with the example of FIG. 6, as new models 620 as obtained by a particular device, the device may evaluate these new models to determine entropy-based weightings for the new models 620. In implementations that utilize data generated by the particular device and decisions derived by the decision trees from this data to determine such entropy-based weightings, the particular device may cache previous data utilized in these weighing calculations to apply this previous data to the new models and generate comparable entropy-based weighting values for these new models. If the device determines that the weightings of these new models 620 suggest that the new models are of sufficient quality, the device may adopt these new decision tree models within its random forest, to thereby generate an updated version of the random forest 605b, which may then be used to make classification predictions for data generated at the particular device.

In some instances, if the new models 620 are determined to have comparable entropy-based weightings that are higher than the weighting values of existing decision trees incorporated in the random forest model, the particular device may replace one or more of these existing decision trees with the preferable new decision trees (at 625). For instance, a local random forest may have an associated rule dictating a maximum size of the random forest, such that the random forest is to have no more than a particular number of constituent decision trees. In some instances, the maximum number of trees in the random forest may be to accommodate limited memory, storage, and/or processing capabilities of the corresponding device. In some cases, the maximum may be a soft, or conditional maximum, such that the maximum number of decision trees may be exceeded (e.g., through the addition of new models (e.g., 620)) if the determined weightings of each of the decision trees is sufficiently high (e.g., above a certain quality control threshold, within a standard deviation of other decision tree weightings, etc.). In still other examples, the decision whether to add or drop decision trees from a random forest may be further based on a minimum random forest size set for the random and whether that minimum size has been met or not, among other examples. In cases where a maximum random forest size applies, each time a new model is received at a particular device, the particular device may respond by evaluating the new model (based on a calculated entropy-based weighting) to determine whether adding the new model would improve the random forest (e.g., by replacing the currently lowest-weighted decision tree currently in the random forest). This process may be implemented continuously on the device, such that changes to the system may be dynamically accounted for in the generation and use of localized random forest classification models at the device.

While some traditional implementations utilize uniform weights, weights trained (in a supervised manner) by a training data set, or weights determined by time decade number, in implementations involving unsupervised models and systems of heterogeneous devices (from which some decision trees are trained and acquired) or system where conditions may change, traditional approaches may yield poor and unreliable results. Accordingly, weighting values may be determined for decision tree models from continuous data (generated by the devices themselves) using entropy and potentially other principles of information theory to model the relative usefulness of the varied decision tree models.

In one example, a theoretically optimal weighting may be determined for an online decision tree ensemble based on the entropy of each decision tree. As noted above, reliably weighting an ensemble in a distributed random forest, such as in some of the examples discussed herein, may be difficult as the distributed system may be characterized (e.g., as is sometimes the case in IoT systems), by dynamic development, as new devices are added and other devices replaced within the network. Further, in many implementations (e.g., IoT) memory may be limited, making it problematic to store extensive historical data to conduct learning (and related weighting of the device's models). Indeed, in some cases, only the most recent data generated and acted upon by a device's random forest model may be able to be cached given the memory limitations of an example device. Additionally, classification problems in IoT systems may often present as unsupervised machine learning problems, such that the true label cannot be obtained for data in runtime, as can be the case in anomaly detection problems.

Given the dynamism and heterogeneity of IoT systems, a distributed approach to building random forest models for IoT classification may be difficult, as some decision trees models may be less (or not) useful for local prediction at the receiving device and may even undermine the overall random forest model's accuracy and performance. Uniform voting, in such cases, may be inadequate. Accordingly, in some implementations, an online ensemble algorithm may be utilized that incorporates entropy-based weighing to learn the weights by minimizing the uncertainty of newly acquired data instances measured by entropy in an unsupervised manner. Specifically, at time t, with a newly collected data $x_t$, by exploiting decision tree models on a device, a set of labels may be obtained $V_t = \{v_t^n\}_{n=1}^{B+N}$ (i.e., representing the set of decisions reached by each tree in the collection of decision trees). Further, using the set of labels $V_t$, in one implementation, an optimal weighting function may be employed that incorporates and considers the respective entropy of a decision tree from the decision to generate an optimal weighting $w_T^*$ according to:

$$w_t^* = \underset{w}{\mathrm{argmin}} \sum_{n=1}^{t} -\sigma(V_n^T w) \log(\sigma(V_n^T w)) - (1 - \sigma(V_n^T w)) \log(1 - \sigma(V_n^T w))$$

where $V_n^T$ is the transpose of the label vector $V_{t=n}$, entropy uses the sigmoid function $\sigma(s) = (1+\exp(-s))^{-1}$ as the probability function, w is a weight vector, with the vector composed of vector element values corresponding to each weighting value of each decision tree in a collection of decision trees to be considered for inclusion in random forest. The $\mathrm{argmin}_w$ function can serve to find a collection of weighting values for the collection of decision trees that minimizes the minimizes the overall entropy $$\sum_{n=1}^{t} -\sigma(V_n^T w) \log(\sigma(V_n^T w)) - (1 - \sigma(V_n^T w)) \log(1 - \sigma(V_n^T w)),$$

to obtain the optimal weighting vector $w_T^*$. In some instances, the above optimization problem may be non-convex. Further, to update weighting values of the respective decision trees based on streaming data (e.g., based on the last-received data and corresponding decision), stochastic gradient descent (SGD) may be utilized in some implementations to learn an approximate $w_t^*$. Specifically, at time stamp t, w may be updated as follows:

$$w_t \leftarrow w_{t-1} - \gamma \sigma(\beta_t) \sigma(-\beta_t) \beta_t$$

where $\beta_t = v_t^T w_{t-1}$, $v_t^T$ is a collection of labels (or "decisions") obtained at time t using the collection of trees and $\gamma$ is a parameter that controls the learning rate of the SGD. The final prediction $y_t$ from the votes of the random forest may then be simply determined by $y_t = \mathrm{sign}(v_t^T w_t)$. Using such techniques, weighting values may be determined from the device's own generated data, without corresponding ground truth labels, in an unsupervised manner. These weightings may then be used, both to define how the respective votes of the individual decision trees are considered within decisions by the random forest model, but also to prioritize and refine the collection of decision trees included in the random forest model, such as discussed above.

As noted above, random forest models may be utilized to provide localized classification of data generated at the device hosting the random forest model. In some examples, such random forest models may be particularly tuned (with corresponding decision trees) to determine whether data generated by the device is anomalous or not. For instance, in an IoT, WSN, or other M2M system where anomalies are generally or by definition uncommon, anomaly detection may be a challenging problem since the differentiation and labeling of anomalies within a data set does not typically exist, making it an unsupervised learning problem in machine learning. Further complicating this issue is the difficulty in obtaining (from the data actually generated by the devices) positive samples of anomalies. In some cases, all data generated by a device or set of devices in a training data set may be assumed to be negative samples (i.e., normal data points). This set of "normal data" may be analyzed to determine a pattern corresponding to normal data generation, resulting in a one-class classification. This one-class classification data set can be applied to a learning framework (supported by the devices themselves, the assistance of a management system, or in some cases the devices and management system in tandem) in order reduce the anomaly detection problem to a one-class supervised learning problem.

A system may be provided with functionality to allow anomalies be identified, utilizing a random forest implemented according to some of the principles introduced above. Anomaly detection may trigger service events to prompt a machine or humans to take action in response to the anomalies. In some implementations, anomaly detection may be carried out at the device, allowing the device itself to determine an anomaly. Detecting anomalies may involve monitoring each of the various types of data generated at the device to determine when data deviates from what is expected. However, rather than passing this data to an outside service (e.g., a management utility) for anomaly detection, by performing anomaly detection on the device (i.e., the source of the data), an anomaly detection scheme may be provided that foregoes use of valuable communication bandwidth. For instance, a device may have limited bandwidth capabilities and, in the case of battery powered devices, continuous network communications may diminish the battery and overall lifespan of the device, among other example issues. Further, many IoT devices may be subject to bounded computation resources (e.g., to preserve battery power, etc.). In one example, device-based anomaly detection in the context of an IoT (or wireless sensor network (WSN)) system may be provided through a distributed framework for anomaly detection using one-class random forests to realize optimized bandwidth requirements and reduced computational overhead for devices in the IoT or WSN system.

A distributed, one-class random forest may be utilized as an anomaly detection model capable of being used at the device for local anomaly detections. A one-class classification may reduce an unsupervised problem to a supervised learning problem for online prediction by sampling outliers from a priori distributions. By their nature, it may difficult to organically obtain positive (anomalous) data points from a dataset and thereby obtain corresponding labels. One-class classification, through an artificially generated set of anomalous data points, may address these issues. Using a random forest as the corresponding supervised learning technique may further address the problem of bounded bandwidth and bounded computation. In terms of bandwidth, random forests may abstract data into compact models. Accordingly, rather than sending all device data over the network, bandwidth use may be minimized to achieve anomaly detection by limiting anomaly detection traffic to the exchange of models between devices (or a backend providing such models) and the reporting of anomalies detected at the devices. In terms of computation, a random forest provides a set of decision trees that allow computational efficient decision-making at the device (e.g., compared to support vector machines (SVM), kernel-based, and other solutions). The sharing of models between devices may implement a distributed framework that emerges as another example advantage of random forests. A random forest may be based on bagging, feature sampling and ensemble. Ensemble is a mechanism of combining multiple decision trees for decision making. Based on the fact that real time decision making usually rely on spatial and temporal locality, it is straightforward to generalize random forests to IoT or WSN systems such that every device only communicates with their nearby (and/or functionally similar) devices for ensembling, among other examples.

A distributed, one-class random forest anomaly detection model may achieve benefits of other anomaly detection schemes. For instance, many state of the art anomaly detection algorithms may be unsupervised and offline and lack up-to-date and positive samples. One-class classification may resolve at least some of these example issues. One-class classification, however, may mandate a significant number of positive exemplar (anomaly) sampling, which can introduce outstanding complexity in space and time in the training time (e.g., one-class SVM). Random forests using random selection of features can effectively reduce the number of desired positive samples as they are only sampled in a subspace of the feature space. Random forest's bagging also may make training and testing more robust against outliers. This, in effect, may further reduce the computational overhead and bandwidth requirement. Additionally, random forests using ensemble may serve well as a foundation for a distributed anomaly detection framework. The state of the art anomaly detection algorithms are typically centralized (e.g., performed by a system separate from and on behalf multiple devices), which can utilize outstanding data traffic over the network between all devices and a centralized computational device. By communicating decision tree models of random forests, instead of the data, over the IoT network, reduced bandwidth may be achieved. Indeed, in some implementations, communication of decision tree models may be further fine-tuned such that models are only communicated when devices come with spatial coherence (e.g., proximity) or hardware/software coherence (e.g., of a same type), which, in turn, may further minimize the related network traffic introduced to support anomaly detection in a system, among other example advantages and features.

As a general matter, the random forest-based anomaly detection model attempts to formulate a model based on a set of devices={$d_i$: i=1 ... n}, on which multiple sensors are provided which measure a data vector v={$x_{ij}^t$: j=1 ... k} at each time t. The anomaly detection model and thresholds (and weighting) applied to the model to generate anomaly predictions may be according to M={($f_i$, $b_i$): i=1 ... d} such that for each devices i, $$f_i, b_i = \underset{f,b}{\mathrm{argmin}} \sum_{t=1}^{\infty} \left| \frac{1}{2}(\mathrm{sign}(f(v_i^t) - b) + 1) - y_i^t \right|$$

where $y_i^t$=1 or 0, denoting the ground truth (anomaly or not) of a data instance $v_i^t$; where M is the model containing function $f(v_i^t)$ and bias b.

Figure 7:
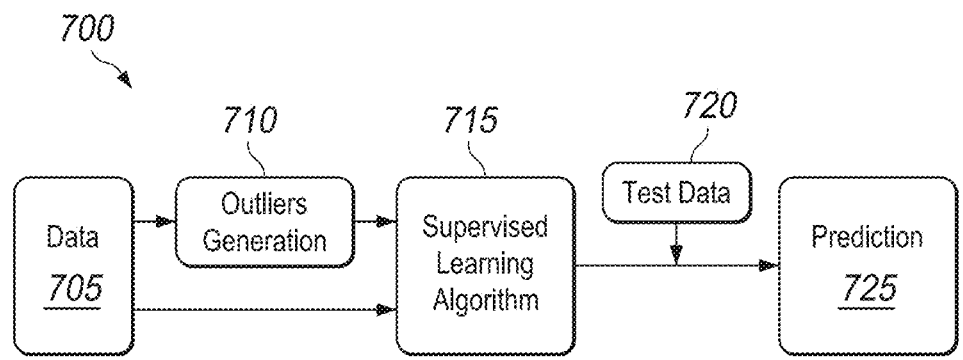
FIG. 7 is a simplified flow diagram illustrating an example of using an anomaly detection model to predict anomalies at a device.

FIG. 7 shows a representative flow of one example of such a learning framework. For instance, training data 705 may be provided as generated at a device (e.g., in connection with the operation of its sensors, actuators, and/or device logic) and used as the basis for artificially generating 710 outlier (i.e., positive anomaly) data (e.g., which is based on deviations from a pattern determined from the training data 705). The resulting anomaly data may be combined with the training data 705 to form a training set that may be processed by a supervised learning module 715 (e.g., utilizing any one of a variety of acceptable supervised learning algorithms).

For instance, by combining the training data set (assumed to be completely negative (normal) samples) with the artificially generated positive samples, as shown in FIG. 7, a label (normal or anomaly) may be applied to each data instance and a supervised learning model may thus be trained based on these instances. The resulting model (e.g., a random forest-based model) may then be used to perform anomaly detection on testing data 720 (e.g., data generated at the device following training and subjected to anomaly detection) to predictably determine 725 anomalies occurring in the testing data 720.

Figure 8:
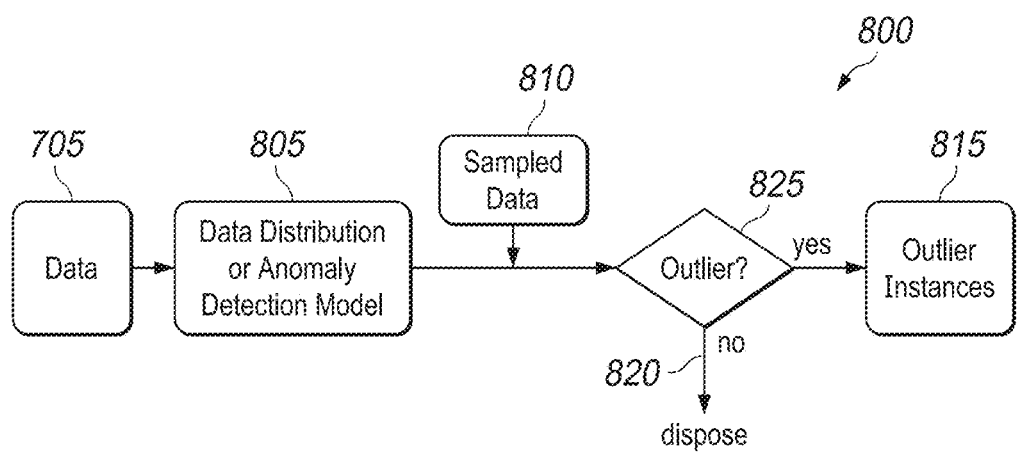
FIG. 8 is a simplified flow diagram illustrating an example generation of anomaly data for use in anomaly detection model training.

In FIG. 8, a simplified block diagram 800 is shown illustrating the flow of example anomaly data generation from a training data 705 (e.g., corresponding to 710 from FIG. 7). Here the training data 705 may be regarded as uniformly normal data, allowing the training data 705 to be utilized by an existing anomaly detection model or probability distribution to determine whether other data values or vectors (e.g., "sample data" 810) constitute an anomaly or not. For example, a multivariate normal distribution may be utilized, first by fitting the training data set to such a distribution and then deriving a probability density function based on the distribution. Other data distributions or anomaly detection models (e.g., 805) may be applied in other examples. A probability density function or anomaly detection model 805 may then be applied to sampled data 810 to determine 825 whether or not the sample is an outlier or not (e.g., according to a given threshold). Any and all data determined to deviate from the distribution of normal data can then be kept 815 as anomaly data to be used in training of anomaly detection models (with any non-anomalous data being discarded 820), among other examples.

Figure 9:
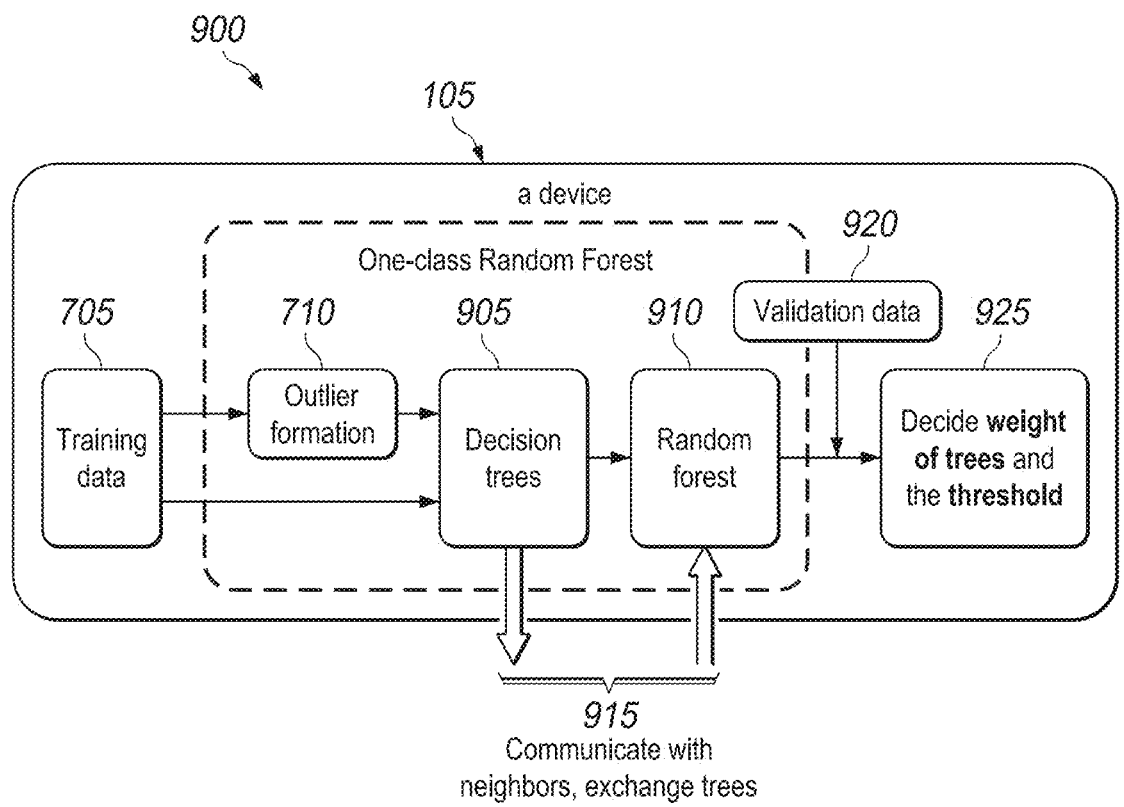
FIG. 9 is a simplified block diagram illustrating example development of a random forest for anomaly detection.

Turning to FIG. 9, a block diagram is shown illustrating training and validation of decision trees for inclusion in an example random tree-based anomaly detection model. Here, a device 105 possesses logic to generate training data 705 and combine the training data with outlier anomaly data generated from the training data (at 710) for use in training of a subset of decision trees 905 to be included in a random forest 910. The decision trees trained at the device may be exchanged (at 915) with other related devices to build the random forest 910. Further, the trees of random forest 910 may be assessed against validation data 920 (e.g., also generated from the training data 705 and/or anomaly data). Normal data may be utilized to generate both the training data 705 and the validation data 920. In one example, a portion of the collected normal data is utilized to generate training data 705 and another portion to generate validation data 920. Validation may be used, in connection with training data to determine (at 620) an initial weighting to be applied to each tree in the random forest 910 (e.g., perform entropy-based weightings are to be determined). Validation may be further utilized to determine a threshold for a final prediction determined from the combined votes of the random forest trees. Validation may be performed independently by each device (e.g., based on its own normal data). In some cases, different weightings and thresholds may be determined during validation of the same random forest as performed by two different devices (utilizing two different validation data sets), among other examples. In one example, validation may involve running the validation data set through the random forest and identifying the highest probability vote (i.e., the probability that a data instance is an anomaly) returned by the random forest during validation. This vote may be adopted as the threshold for the random forest in some implementations.

Figure 10:
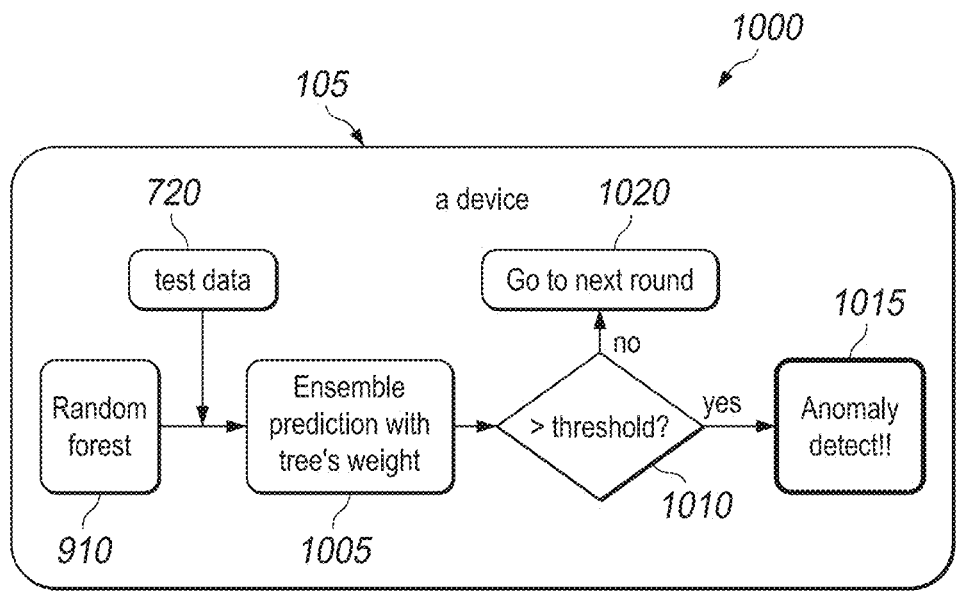
FIG. 10 is a simplified block diagram illustrating example detection of anomalies on a device of an example machine-to-machine system.

Turning to the simplified block diagram 1000 of FIG. 10, the trained random forest model 910 on a device 105 may be applied to test data 720 (e.g., in real time as it generated by the device 105) and a set of votes may be generated by each of the decision trees in the random forest 910 for each test data instance. The determined weight for each decision tree in the random forest 910 may be applied against the base vote values determined by the trees for a given data instance. In one example, each tree may generate a value between 0 and 1 representing a probability that a data instance is an anomaly ("1") or not ("0"). The vote may be multiplied by the weighting to generate a final weighted vote. The collection of weighted votes may then be assessed to determine (at 1005) a final vote or ensemble prediction (e.g., a median value determined from the combined weighted tree vote values). The ensemble prediction value may then be compared (at 1010) to a threshold value determined for the random forest 910 to determine whether the prediction represents a predicted anomaly 1015 or a predicted normal data instance 1020. If an anomaly is predicted 1015, an event may be triggered to report the anomaly to a management system. If a data instance is determined as normal 1020, a next data instance may be assessed using the model, and so on.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 11:
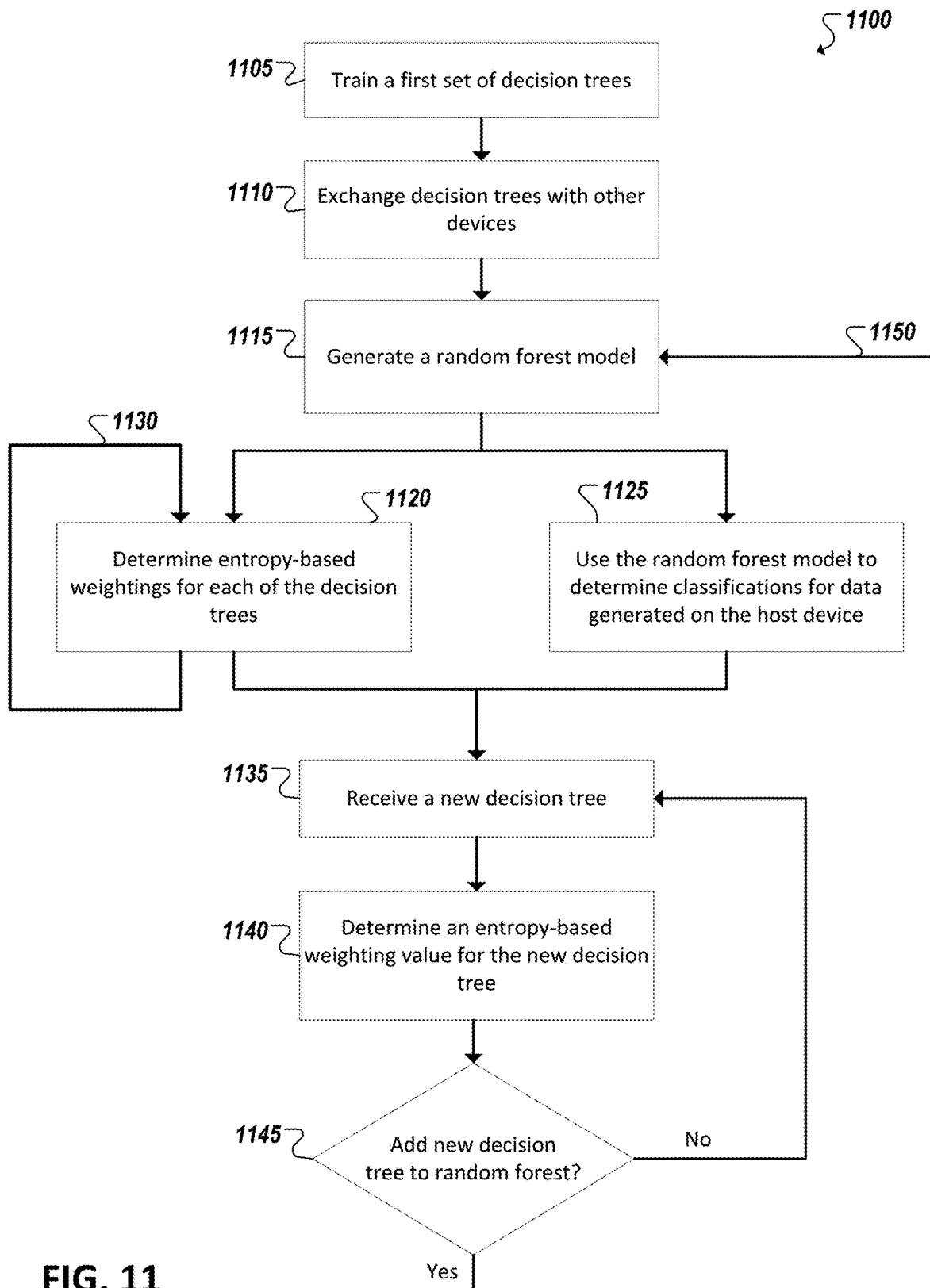
FIG. 11 is a flowchart illustrating an example technique for developing and using a local random forest model at a device.

FIG. 11 is a simplified flowchart 1100 illustrating an example technique for developing and using a random forest model that is built to consider the entropy of each of its composite decision trees. For instance, a device may initially receive or be provisioned with one or more decision trees. The device may train 1105 this first set of decision trees. For instance, training data may be identified and accessed that was generated (e.g., during operation) by a particular device. The training data, in one example, may represent a one-class classification and anomaly data may be generated based on the training data to provide positive samples and labeling of the data set. Such anomaly data may be identified, accessed, and combined with the training data for use in training 1105 the first set (e.g., a one or a plurality) of decision trees maintained locally at the device. Upon training the decision trees, a set of companion devices may be identified, which likewise maintain (and have trained) decision trees usable by the particular device to predict anomalies in data instances generated by the particular device. The decision trees trained by the particular device may be exchanged 1110 with these companion devices, such that the particular device receives copies of the trained decision trees of the other devices and sends copies of its locally trained decision trees to the companion devices. Each device may then generate 1115 a separate instance of a random forest model from the decision trees it exchanges 1110 with other (e.g., similar) devices in a system. The random forest may then be used 1125 at the device to predict classifications of data generated at the device.

In some implementations, entropy-based weightings may be determined 1120 for each of the multiple decision trees included in a particular random forest model. The weighting values may be determined 1120 in connection with decisions (at 1125) made using the trees in the random forest model. The entropy-based weighting may be continuously updated (at 1130) as new data and decision tree predictions are made and logged at the device. Further, new weighting determinations may be made in connection with new decision tree models being received at the device and potentially added to the random forest model of the device. For instance, a new decision tree may be received 1135 and a corresponding entropy-based weighting value may be determined 1140 for the new decision tree (e.g., based on cached input data (previously provided to the existing decision trees) being provided to the new decision tree to determine a corresponding prediction). Based on the determined weighting of the new decision tree, a determination 1145 may be made as to whether to add the new decision tree to the device's local random forest model or not. For example, if the weighting determined (e.g., at 1140) for the new decision tree is insufficiently high, the new decision tree may be rejected and not added to the random forest model. However, if the weighting determined for the new decision tree is sufficiently high, the new decision tree may be added to the random forest to cause (at 1150) an updated version of the random forest model to be generated 1115. In some cases, adding the new decision tree to the random forest may cause one or more of the decision trees in the previous version of the random forest to be removed from the random forest and replaced with the new decision tree, among other examples.

Figure 12:
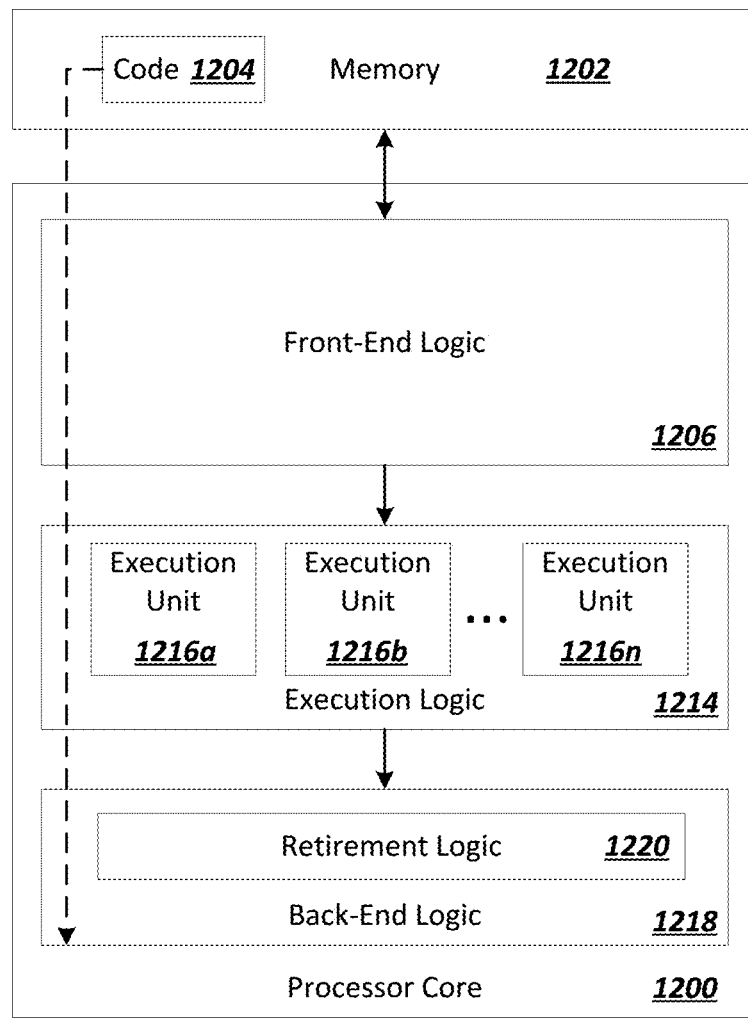
FIG. 12 is a block diagram of an exemplary processor in accordance with one embodiment.
Figure 13:
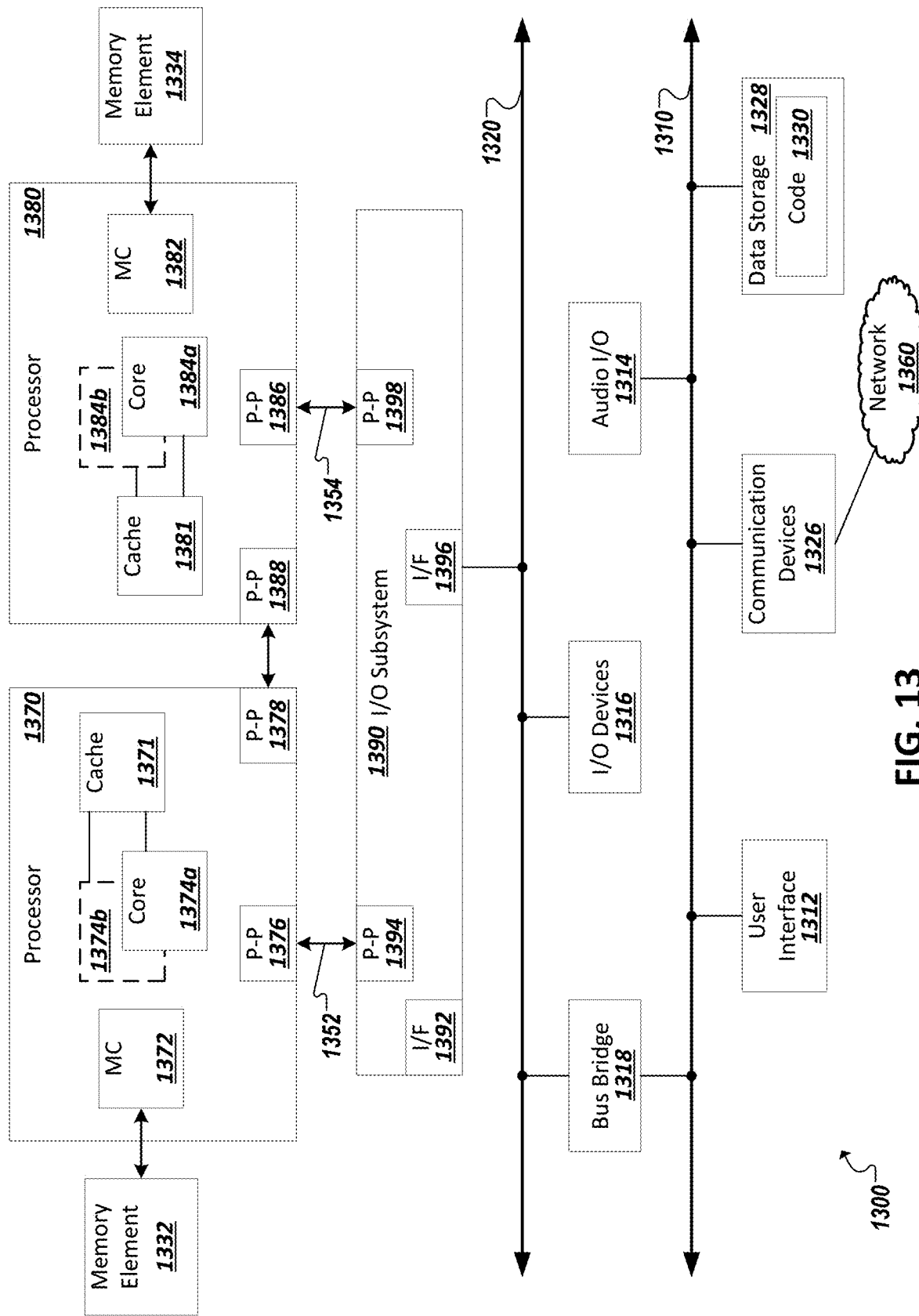
FIG. 13 is a block diagram of an exemplary computing system in accordance with one embodiment.

FIGS. 12-13 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 12-13.

FIG. 12 is an example illustration of a processor according to an embodiment. Processor 1200 is an example of a type of hardware device that can be used in connection with the implementations above. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a computing system 1300 that is arranged in a point-to-point (PtP) configuration according to an embodiment. In particular, FIG. 13 shows a system where processors, memory, and input/output devices are interconnected by a number of point-to-point interfaces. Generally, one or more of the computing systems described herein may be configured in the same or similar manner as computing system 1300.

Processors 1370 and 1380 may also each include integrated memory controller logic (MC) 1372 and 1382 to communicate with memory elements 1332 and 1334. In alternative embodiments, memory controller logic 1372 and 1382 may be discrete logic separate from processors 1370 and 1380. Memory elements 1332 and/or 1334 may store various data to be used by processors 1370 and 1380 in achieving operations and functionality outlined herein.

Processors 1370 and 1380 may be any type of processor, such as those discussed in connection with other figures. Processors 1370 and 1380 may exchange data via a point-to-point (PtP) interface 1350 using point-to-point interface circuits 1378 and 1388, respectively. Processors 1370 and 1380 may each exchange data with a chipset 1390 via individual point-to-point interfaces 1352 and 1354 using point-to-point interface circuits 1376, 1386, 1394, and 1398. Chipset 1390 may also exchange data with a high-performance graphics circuit 1338 via a high-performance graphics interface 1339, using an interface circuit 1392, which could be a PtP interface circuit. In alternative embodiments, any or all of the PtP links illustrated in FIG. 13 could be implemented as a multi-drop bus rather than a PtP link.

Chipset 1390 may be in communication with a bus 1320 via an interface circuit 1396. Bus 1320 may have one or more devices that communicate over it, such as a bus bridge 1318 and I/O devices 1316. Via a bus 1310, bus bridge 1318 may be in communication with other devices such as a user interface 1312 (such as a keyboard, mouse, touchscreen, or other input devices), communication devices 1326 (such as modems, network interface devices, or other types of communication devices that may communicate through a computer network 1360), audio I/O devices 1314, and/or a data storage device 1328. Data storage device 1328 may store code 1330, which may be executed by processors 1370 and/or 1380. In alternative embodiments, any portions of the bus architectures could be implemented with one or more PtP links.

The computer system depicted in FIG. 13 is a schematic illustration of an embodiment of a computing system that may be utilized to implement various embodiments discussed herein. It will be appreciated that various components of the system depicted in FIG. 13 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, the instructions when executed on a machine, cause the machine to determine a weighting value for each of a plurality of decision trees in a random forest model hosted on a particular device, where the weighting is based on entropy of the respective decision tree; receive a new decision tree over a network connection; determine a weighting value for the new decision tree based on entropy of the new decision tree; determine whether to add the new the decision tree to the random forest model based on the weighting value; and predict a classification for data generated at the particular device using the random forest model.

Example 2 may include the subject matter of example 1, where the weighting values for the plurality of decision trees are to be determined from a label set based on a set of input data and a set of corresponding decisions generated by the respective decision tree based on the set of input data.

Example 3 may include the subject matter of example 2, where the instructions, when executed, further cause the machine to cache the set of input data, and determining the weighting value for the new decision tree is to include: providing the set of input data to the new decision tree; generating a set of new decisions using the new decision tree based on the set of input data; and determining a new label data set based on the set of new decisions, where the new label data is used to determining the weighting value for the new decision tree.

Example 4 may include the subject matter of example 3, where the weighting values for the plurality of decision trees are determined using an optimization function, and the optimization function is to be used to determine the weighting value for the new decision tree.

Example 5 may include the subject matter of any one of examples 2-4, where the input data includes data generated by the particular device during a first window.

Example 6 may include the subject matter of example 5, where the input data includes first input data and the instructions, when executed, further cause the machine to: identify second input data generated by the particular device during a second window, where the second window ends subsequent to the first window; use the decision trees of the random forest model to determine a second set of decisions based on the second input data; determine a respective updated weighting value for each decision tree in the random forest model, where the updated weighting value is also based on entropy of the respective decision tree and further based on the second input data and second set of decisions.

Example 7 may include the subject matter of any one of examples 1-6, where the new decision tree is determined to be added to the random forest model based on the weighting value determined for the new decision tree, where adding the new decision tree to the random forest model includes generation of an updated random forest model.

Example 8 may include the subject matter of example 7, where generation of the updated random forest model includes replacing at least a particular one of the plurality of decision trees with the new decision tree based on the weighting value of the new decision tree being higher than a weighting value for the particular decision tree.

Example 9 may include the subject matter of example 8, where the random forest model has a maximum number of decision trees and the particular decision tree is replaced to satisfy the maximum number of decision trees set for the random forest model.

Example 10 may include the subject matter of any one of examples 1-9, where the instructions, when executed, further cause the machine to: train a first set of decision trees; send copies of the trained first set of decision trees to a second device in a machine-to-machine network; receive copies of a second set of decision trees from the second device; generate the random forest model to include the first and second sets of decision trees in the plurality of decision trees.

Example 11 may include the subject matter of example 10, where the new decision tree is received from another device in a network including the particular device and the other device.

Example 12 may include the subject matter of example 11, where the network includes a plurality of devices, the other device is a new device within the network.

Example 13 may include the subject matter of any one of examples 1-12, where the classification includes a prediction of whether each data instance in a set of data generated by the particular device is an anomaly.

Example 14 may include the subject matter of any one of examples 1-13, where using the random forest model predict a classification for a particular data instance generated at the particular device includes: determining a decision for each decision tree in the random forest model; and using the decisions to determine a prediction for the particular data instance.

Example 15 is a method including: determining a weighting value for each of a plurality of decision trees in a random forest model hosted on a particular device, where the weighting is based on entropy of the respective decision tree; receiving a new decision tree over a network connection; determining a weighting value for the new decision tree based on entropy of the new decision tree; determining whether to add the new the decision tree to the random forest model based on the weighting value; and predicting a classification for data generated at the particular device using the random forest model.

Example 16 may include the subject matter of example 15, where the weighting values for the plurality of decision trees are to be determined from a label set based on a set of input data and a set of corresponding decisions generated by the respective decision tree based on the set of input data.

Example 17 may include the subject matter of example 16, further including caching the set of input data, and determining the weighting value for the new decision tree is to include: providing the set of input data to the new decision tree; generating a set of new decisions using the new decision tree based on the set of input data; and determining a new label data set based on the set of new decisions, where the new label data is used to determining the weighting value for the new decision tree.

Example 18 may include the subject matter of example 17, where the weighting values for the plurality of decision trees are determined using an optimization function, and the optimization function is to be used to determine the weighting value for the new decision tree.

Example 19 may include the subject matter of any one of examples 16-18, where the input data includes data generated by the particular device during a first window.

Example 20 may include the subject matter of example 19, where the input data includes first input data and the method further includes: identifying second input data generated by the particular device during a second window, where the second window ends subsequent to the first window; using the decision trees of the random forest model to determine a second set of decisions based on the second input data; determining a respective updated weighting value for each decision tree in the random forest model, where the updated weighting value is also based on entropy of the respective decision tree and further based on the second input data and second set of decisions.

Example 21 may include the subject matter of any one of examples 15-20, where the new decision tree is determined to be added to the random forest model based on the weighting value determined for the new decision tree, where adding the new decision tree to the random forest model includes generation of an updated random forest model.

Example 22 may include the subject matter of example 21, where generation of the updated random forest model includes replacing at least a particular one of the plurality of decision trees with the new decision tree based on the weighting value of the new decision tree being higher than a weighting value for the particular decision tree.

Example 23 may include the subject matter of example 22, where the random forest model has a maximum number of decision trees and the particular decision tree is replaced to satisfy the maximum number of decision trees set for the random forest model.

Example 24 may include the subject matter of any one of examples 15-23, further includes: training a first set of decision trees; sending copies of the trained first set of decision trees to a second device in a machine-to-machine network; receiving copies of a second set of decision trees from the second device; and generating the random forest model to include the first and second sets of decision trees in the plurality of decision trees.

Example 25 may include the subject matter of example 24, where the new decision tree is received from another device in a network including the particular device and the other device.

Example 26 may include the subject matter of example 25, where the network includes a plurality of devices, the other device is a new device within the network.

Example 27 may include the subject matter of any one of examples 15-26, where the classification includes a prediction of whether each data instance in a set of data generated by the particular device is an anomaly.

Example 28 may include the subject matter of any one of examples 15-27, where using the random forest model predict a classification for a particular data instance generated at the particular device includes: determining a decision for each decision tree in the random forest model; and using the decisions to determine a prediction for the particular data instance.

Example 29 is a system including means to perform at least a portion of any one of the methods of examples 15-28.

Example 30 is a system including: a first device including a processor device, memory, a communication module to communicate over a network, and decision tree model logic. The decision tree model logic is executable by the processor device to: determine a weighting value for each of a plurality of decision trees in a random forest model hosted in the memory of the first device, where the weighting is based on entropy of the respective decision tree; identify a new decision tree received over the network; determine a weighting value for the new decision tree based on entropy of the new decision tree; determine whether to add the new decision tree to the random forest model based on the weighting value; and predict a classification for data generated at the first device using the random forest model.

Example 31 may include the subject matter of example 30, where the first device further includes one or more sensors to generate the data.

Example 32 may include the subject matter of any one of examples 30-31, where the weighting values for the plurality of decision trees are to be determined from a label set based on a set of input data and a set of corresponding decisions generated by the respective decision tree based on the set of input data, and the set of input data is to be cached in the memory for use in determining the weighting value of the new decision tree.

Example 33 may include the subject matter of any one of examples 30-32, further including: a second device to train a set of decision trees and send copies of the set of decision trees to the first device over the network, where the plurality of decision trees includes the copies of the set of decision trees.

Example 34 may include the subject matter of example 33, where the set of decision trees includes a first set of decision trees, and the decision tree logic of the first device is further to: train a second set of decision trees; and send copies of the second set of decision trees to the second device over the network, where the plurality of decision trees further includes the second set of decision trees, and the second device is to generate a random forest including at least the first set of decision trees and the copies of the second set of decision trees.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
   determine a respective entropy-based weighting value for each of a plurality of decision trees in a random forest model hosted on a particular device, wherein the entropy-based weighting is based on entropy of the respective decision tree;
   receive a new decision tree over a network connection;
   determine a particular entropy-based weighting value for the new decision tree based on entropy of the new decision tree;
   determine whether to add the new decision tree to the random forest model based on the particular entropy-based weighting value of the new decision tree, wherein a determination to add the new decision tree to the random forest model comprises determining that the particular entropy-based weighting value is higher than the entropy-based weighting value of at least one other decision tree in the plurality of decision trees in the random forest model; and
   predict a classification for data generated at the particular device using the random forest model.

2. The non-transitory storage medium of claim 1, wherein the respective entropy-based weighting values for the plurality of decision trees are to be determined from a label set based on a set of input data and a set of corresponding decisions generated by the respective decision tree based on the set of input data.

3. The non-transitory storage medium of claim 2, wherein the instructions, when executed, further cause the machine to cache the set of input data, and determining the particular entropy-based weighting value for the new decision tree is to comprise:
provide the set of input data to the new decision tree;
generating a set of new decisions using the new decision tree based on the set of input data; and
determining a new label data set based on the set of new decisions, wherein the new label data is used to determine the particular entropy-based weighting value for the new decision tree.

4. The non-transitory storage medium of claim 3, wherein the respective entropy-based weighting values for the plurality of decision trees are determined using an optimization function, and the optimization function is to be used to determine the particular entropy-based weighting value for the new decision tree.

5. The non-transitory storage medium of claim 2, wherein the input data comprises data generated by the particular device during a first window.

6. The non-transitory storage medium of claim 5, wherein the input data comprises first input data and the instructions, when executed, further cause the machine to:
identify second input data generated by the particular device during a second window, wherein the second window ends subsequent to the first window;
use the decision trees of the random forest model to determine a second set of decisions based on the second input data;
determine a respective updated weighting value for each decision tree in the random forest model, wherein the updated weighting value is also based on entropy of the respective decision tree and further based on the second input data and second set of decisions.

7. The non-transitory storage medium of claim 1, wherein the new decision tree is determined to be added to the random forest model based on the particular entropy-based weighting value determined for the new decision tree, wherein adding the new decision tree to the random forest model comprises generation of an updated random forest model.

8. The non-transitory storage medium of claim 7, wherein generation of the updated random forest model comprises replacing the other decision tree with the new decision tree based on the particular entropy-based weighting value of the new decision tree being higher than the entropy-based weighting value for the other decision tree.

9. The non-transitory storage medium of claim 8, wherein the random forest model has a maximum number of decision trees and the other decision tree is replaced to satisfy the maximum number of decision trees set for the random forest model.

10. The non-transitory storage medium of claim 1, wherein the instructions, when executed, further cause the machine to:
train a first set of decision trees;
send copies of the trained first set of decision trees to a second device in a machine-to-machine network;
receive copies of a second set of decision trees from the second device;
generate the random forest model to include the first and second sets of decision trees in the plurality of decision trees.

11. The non-transitory storage medium of claim 10, wherein the new decision tree is received from another device in a network comprising the particular device and the other device.

12. The non-transitory storage medium of claim 11, wherein the network comprises a plurality of devices, the other device is a new device within the network.

13. The non-transitory storage medium of claim 1, wherein the classification comprises a prediction of whether each data instance in a set of data generated by the particular device is an anomaly.

14. The non-transitory storage medium of claim 1, wherein using the random forest model predict a classification for a particular data instance generated at the particular device comprises:
determining a decision for each decision tree in the random forest model; and
using the decisions to determine a prediction for the particular data instance.

15. A method comprising:
determining a respective weighting value for each of a plurality of decision trees in a random forest model hosted on a particular device, wherein the weighting value is based on entropy of the respective decision tree;
receiving a new decision tree over a network connection;
determining a particular weighting value for the new decision tree based on entropy of the new decision tree;
determining whether to add the new decision tree to the random forest model based on whether the particular weighting value of the new decision tree is higher than the respective weighting value of at least one other decision tree in the plurality of decision trees; and
predicting a classification for data generated at the particular device based on weighted individual votes generated by each one of the decision trees in the random forest model, wherein each of the votes is weighted based on the respective weighting value of the corresponding tree.

16. A system comprising:
a first device comprising:
a processor device;
memory;
a communication module to communicate over a network; and
decision tree model logic executable by the processor device to:
determine a respective weighting value for each of a plurality of decision trees in a random forest model hosted in the memory of the first device, wherein the weighting is based on entropy of the respective decision tree;
identify a new decision tree received over the network;
determine a particular weighting value for the new decision tree based on entropy of the new decision tree;
determine whether to add the new decision tree to the random forest model based on whether the particular weighting value of the new decision tree is higher than the respective weighting value of at least one other decision tree in the plurality of decision trees; and
predict a classification for data generated at the first device using the random forest model.

17. The system of claim 16, wherein the first device further comprises one or more sensors to generate the data.

18. The system of claim 16, wherein the respective weighting values for the plurality of decision trees are to be determined from a label set based on a set of input data and a set of corresponding decisions generated by the respective decision tree based on the set of input data, and the set of input data is to be cached in the memory for use in determining the particular weighting value of the new decision tree.

19. The system of claim 16, further comprising:
a second device to train a set of decision trees and send copies of the set of decision trees to the first device over the network, wherein the plurality of decision trees comprises the copies of the set of decision trees.

20. The system of claim 19, wherein the set of decision trees comprises a first set of decision trees, and the decision tree logic of the first device is further to:
train a second set of decision trees; and
send copies of the second set of decision trees to the second device over the network, wherein the plurality of decision trees further comprises the second set of decision trees, and the second device is to generate a random forest comprising at least the first set of decision trees and the copies of the second set of decision trees.

* * * * *